(12) United States Patent
Kasztenny et al.

(10) Patent No.: US 8,289,668 B2
(45) Date of Patent: Oct. 16, 2012

(54) CHARGING CURRENT COMPENSATION FOR LINE CURRENT DIFFERENTIAL PROTECTION

(75) Inventors: Bogdan Z. Kasztenny, Markham (CA); Normann Fischer, Colfax, WA (US)

(73) Assignee: Schweitzer Engineering Laboratories, Inc., Pullmam, WA (US)

( * ) Notice: Subject to any disclaimer, the term of this patent is extended or adjusted under 35 U.S.C. 154(b) by 435 days.

(21) Appl. No.: 12/561,972

(22) Filed: Sep. 17, 2009

(65) Prior Publication Data

US 2011/0063767 A1   Mar. 17, 2011

(51) Int. Cl.
  *H02H 3/00*   (2006.01)
(52) U.S. Cl. .................. 361/87; 361/44; 361/47; 361/66
(58) Field of Classification Search .................... 361/44, 361/47, 66, 87
  See application file for complete search history.

(56) References Cited

U.S. PATENT DOCUMENTS

| | | | |
|---|---|---|---|
| 2,209,810 A | 7/1940 | Cordroy | |
| 3,558,984 A | 1/1971 | Smith | |
| 4,322,768 A | 3/1982 | Maeda | |
| 5,367,426 A | 11/1994 | Schweitzer, III | |
| 5,671,112 A | 9/1997 | Hu | |
| 5,805,395 A | 9/1998 | Hu | |
| 6,256,592 B1 | 7/2001 | Roberts | |
| 6,341,055 B1 | 1/2002 | Guzman-Casillas | |
| 6,356,421 B1 | 3/2002 | Guzman-Casillas | |
| 6,456,947 B1 | 9/2002 | Adamiak | |
| 6,518,767 B1 | 2/2003 | Roberts | |
| 6,571,182 B2 | 5/2003 | Adamiak | |
| 6,590,397 B2 | 7/2003 | Roberts | |
| 6,879,917 B2 | 4/2005 | Turner | |
| 7,345,863 B2 | 3/2008 | Fischer | |
| 7,425,778 B2 | 9/2008 | Labuschagne | |
| 7,472,026 B2 | 12/2008 | Premerlani | |
| 2001/0012984 A1 | 8/2001 | Adamiak | |
| 2002/0101229 A1 | 8/2002 | Roberts | |
| 2007/0070565 A1 | 3/2007 | Benmouyal | |
| 2009/0091867 A1 | 4/2009 | Guzman-Casillas | |
| 2010/0002348 A1 | 1/2010 | Donolo | |

OTHER PUBLICATIONS

Bogdan Kasztenny, Ilia Voloh, Eric A. Udren, Rebirth of Phase Comparison Line Protection Principle, 60th Annual Georgia Tech Protective Relaying Conference, Atlanta, Georgia, May 3-5, 2006.

(Continued)

*Primary Examiner* — Rexford Barnie
*Assistant Examiner* — Tien Mai
(74) *Attorney, Agent, or Firm* — Stoel Rives LLP

(57) ABSTRACT

Current differential protection with charging current compensation is provided for a power apparatus, such as a power transmission line. Individual terminals dynamically determine their respective contributions, if any, to the charging current compensation value as availability of one or more voltage sources dynamically changes within the power apparatus. Respective terminals calculate local contributions to a charging current compensation value based on local voltage measurements. A loss of a voltage source is handled by adjusting multipliers for the remaining compensation points to reflect the total charging current. A local contribution is suppressed when the local voltage source is no longer available. After applying the local contributions, an alpha plane analysis may be used to determine when to trip the power apparatus.

25 Claims, 22 Drawing Sheets

OTHER PUBLICATIONS

Min Zhang, Xinzhou Dong, Z Q Bo, B R J Caunce, A Klimek, Simulation Tests of a Novel Criterion for Neutral Current Differential Protection, International Conference on Power System Technology, 2006.

PCT/US2010/049166 Patent Cooperation Treaty, International Search Report and Written Opinion of the International Searching Authority, Dec. 13, 2010.

Jeff Roberts, Demetrios Tziouvaras, Gabriel Benmouyal, Hector Altuve, The Effect of Multiprinciple Line Protection on Dependability and Security, Jun. 22-27, 2003.

Debra Carroll and John Dorfner, Tacoma Power, Tony Lee and Ken Fodero, Schweitzer Engineering Laboratories, Inc., Chris Huntley, GE Lentronics,Resolving Digital Line Current Differential Relay Security and Dependability Problems: A Case History 29th Annual Western Protective Relay Conference, Spokane Washington, Oct. 22-24, 2002.

Gabriel Benmouyal, Joe B. Mooney, Schweitzer Engineering Laboratories, Inc., Advanced Sequence Elements for Line Current Differential Protection, 2006.

Demetrios A. Tziouvaras, Jeff Roberts, and Gabriel Benmouyal, Schweitzer Engineering Laboratories, Inc., New Multi-Ended Fault Location Design for Two- or Three-Terminal Lines, Nov. 1, 2004.

Gabriel Benmouyal, Schweitzer Engineering Laboratories, Inc., The Trajectories of Line Current Differential Faults in the Alpha Plane, Sep. 22, 2005.

GE Industrial Systems L90 Line Current Differential System, UR Series Instruction Manual, Section 8, Manual P/N:1601-0081-T1(GEK-113488) L90 revision: 5.6x 2008, Section 8.

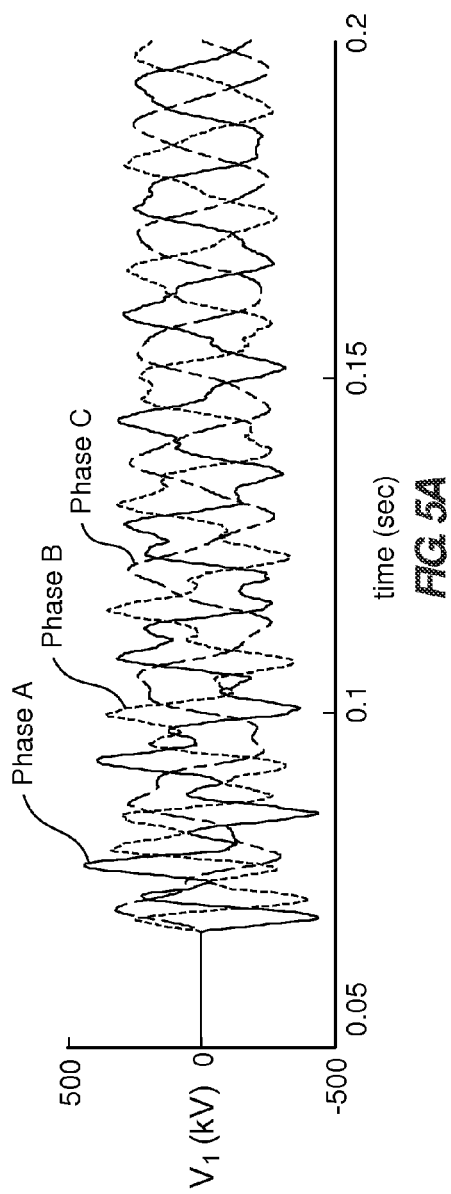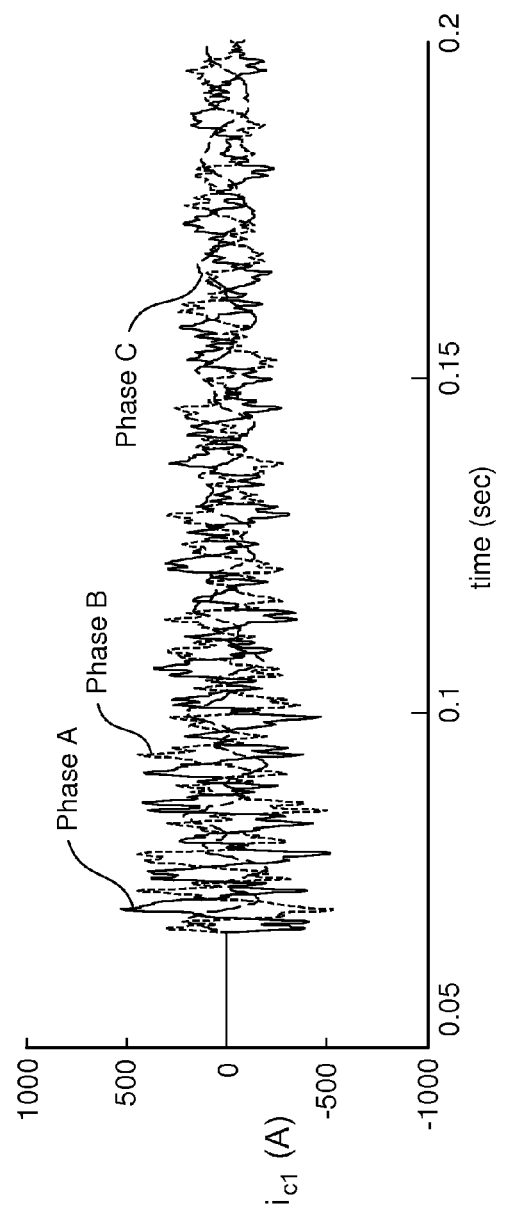

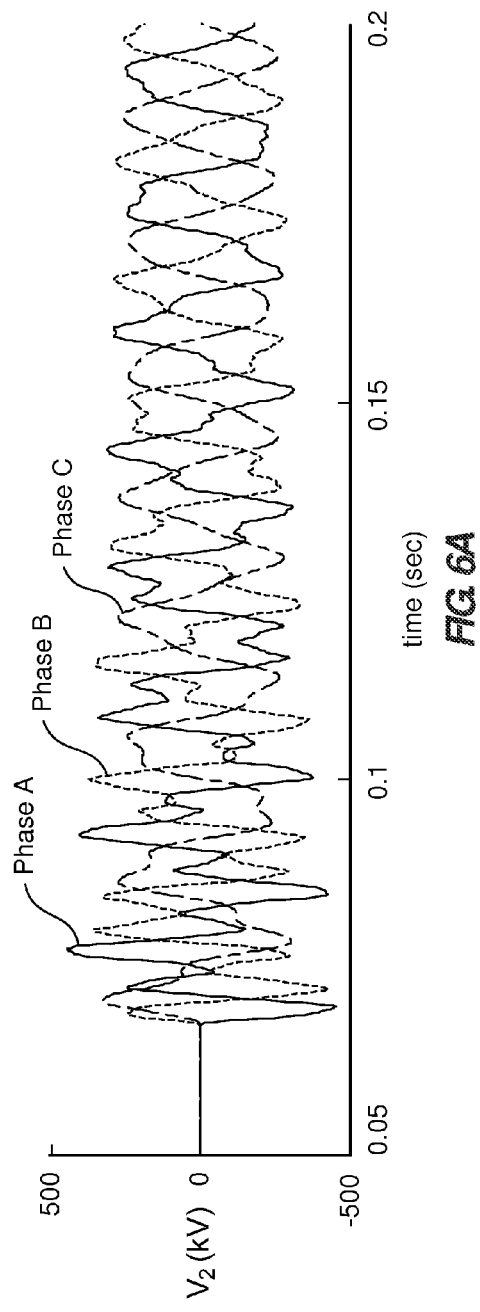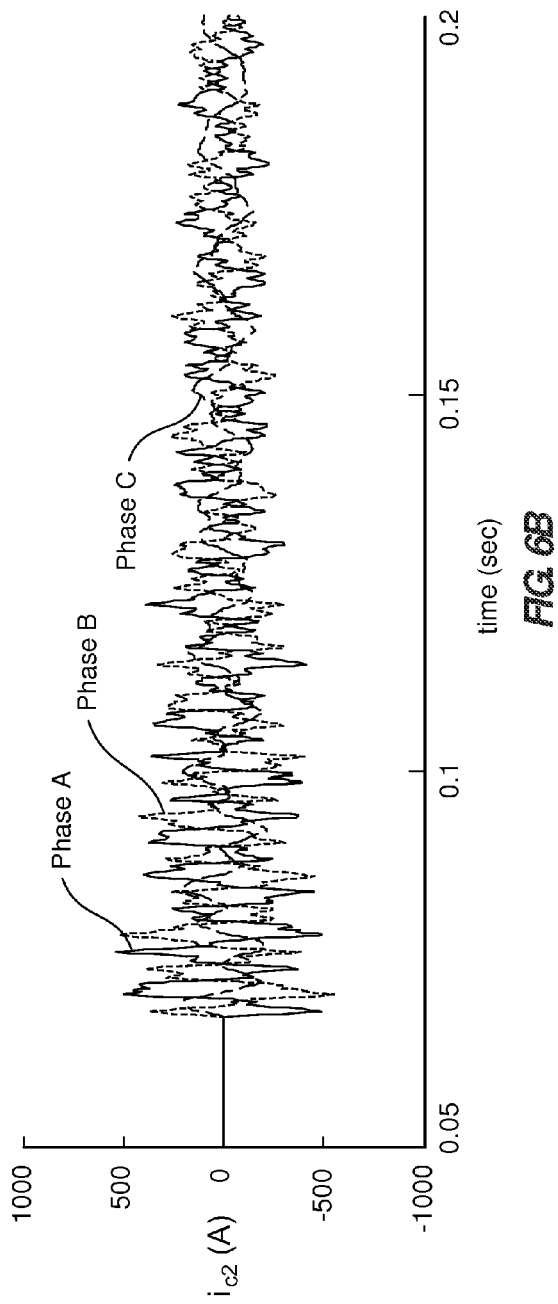

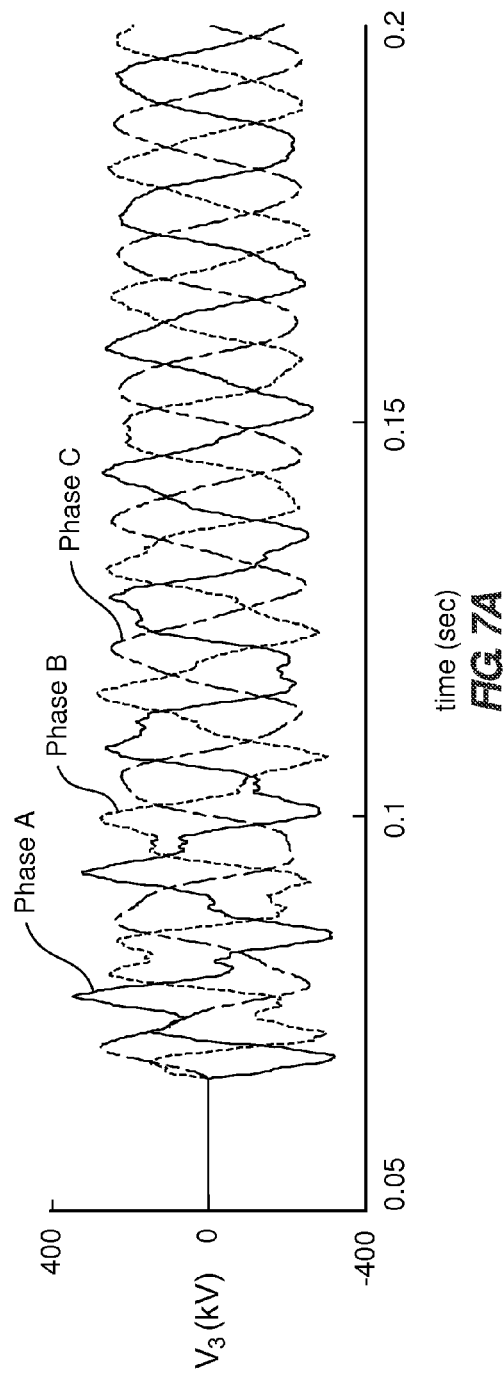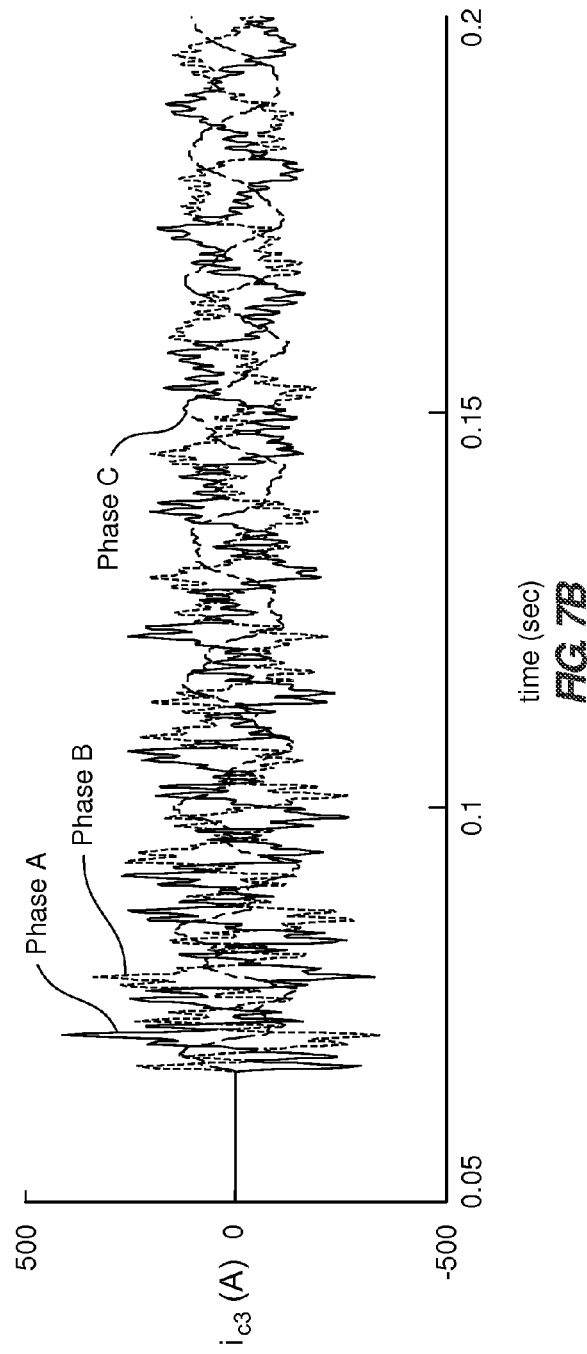

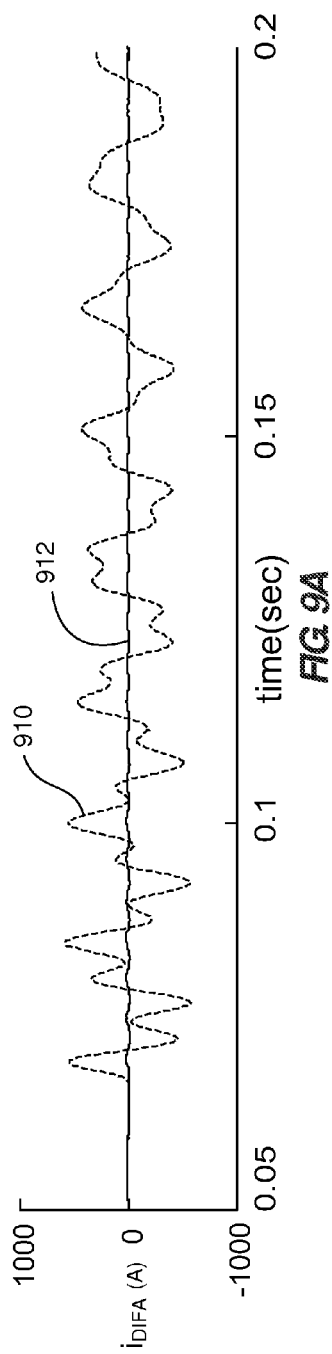
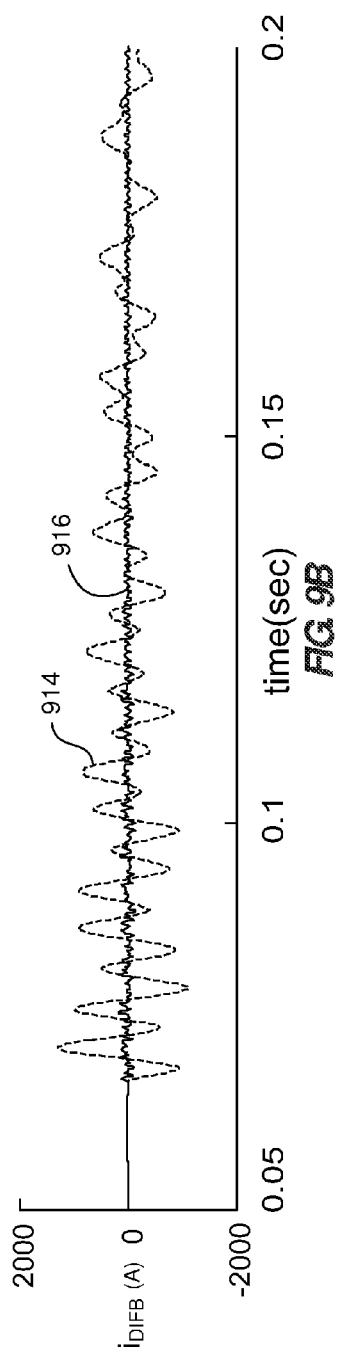
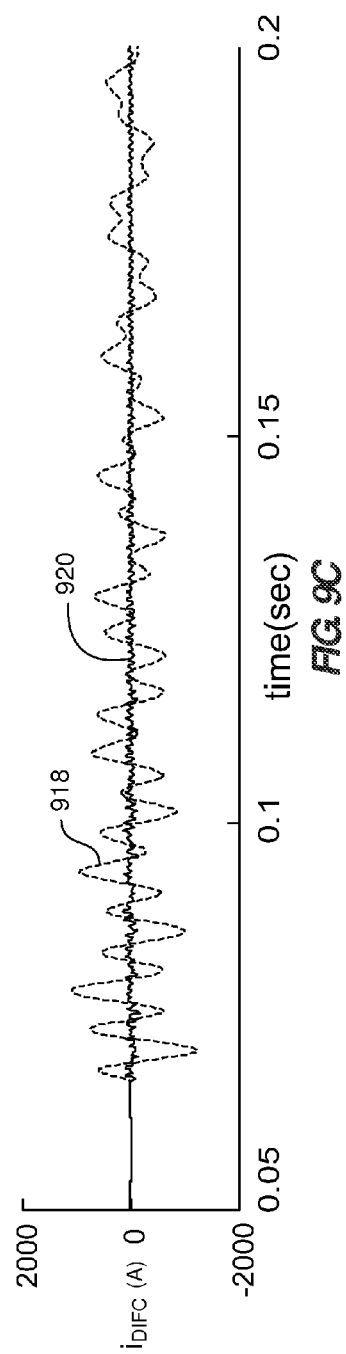

CHARGING CURRENT COMPENSATION FOR LINE CURRENT DIFFERENTIAL PROTECTION

TECHNICAL FIELD

This disclosure relates to differential protection systems. More particularly, this disclosure includes systems and methods for line current differential protection with charging current compensation that is tolerant to the loss of one or more voltage input sources.

BRIEF DESCRIPTION OF THE DRAWINGS

Non-limiting and non-exhaustive embodiments of the disclosure are described, including various embodiments of the disclosure with reference to the figures, in which:

FIG. 5A graphically illustrates waveforms of voltages and FIG. 5B graphically illustrates waveforms of calculated shares of the corresponding charging current for a first terminal in a simulation example embodiment;

FIG. 6A graphically illustrates waveforms of voltages and FIG. 6B graphically illustrates waveforms of calculated shares of the corresponding charging current for a second terminal in the simulation example embodiment shown in FIGS. 5A and 5B;

FIG. 7A graphically illustrates waveforms voltages and FIG. 7B graphically illustrates waveforms of calculated shares of the corresponding charging current for a third terminal in the simulation example embodiment shown in FIGS. 5A, 5B, 6A, and 6B;

FIG. 9A graphically illustrates a differential current waveform without compensation and a differential waveform with compensation for phase A according to the example embodiment shown in FIGS. 5A, 5B, 6A, 6B, 7A, and 7B;

FIG. 9B graphically illustrates a differential current waveform without compensation and a differential waveform with compensation for phase B according to the example embodiment shown in FIGS. 5A, 5B, 6A, 6B, 7A, and 7B;

FIG. 9C graphically illustrates a differential current waveform without compensation and a differential waveform with compensation for phase C according to the example embodiment shown in FIGS. 5A, 5B, 6A, 6B, 7A, and 7B;

DETAILED DESCRIPTION OF PREFERRED EMBODIMENTS

Introduction

Figure 1:
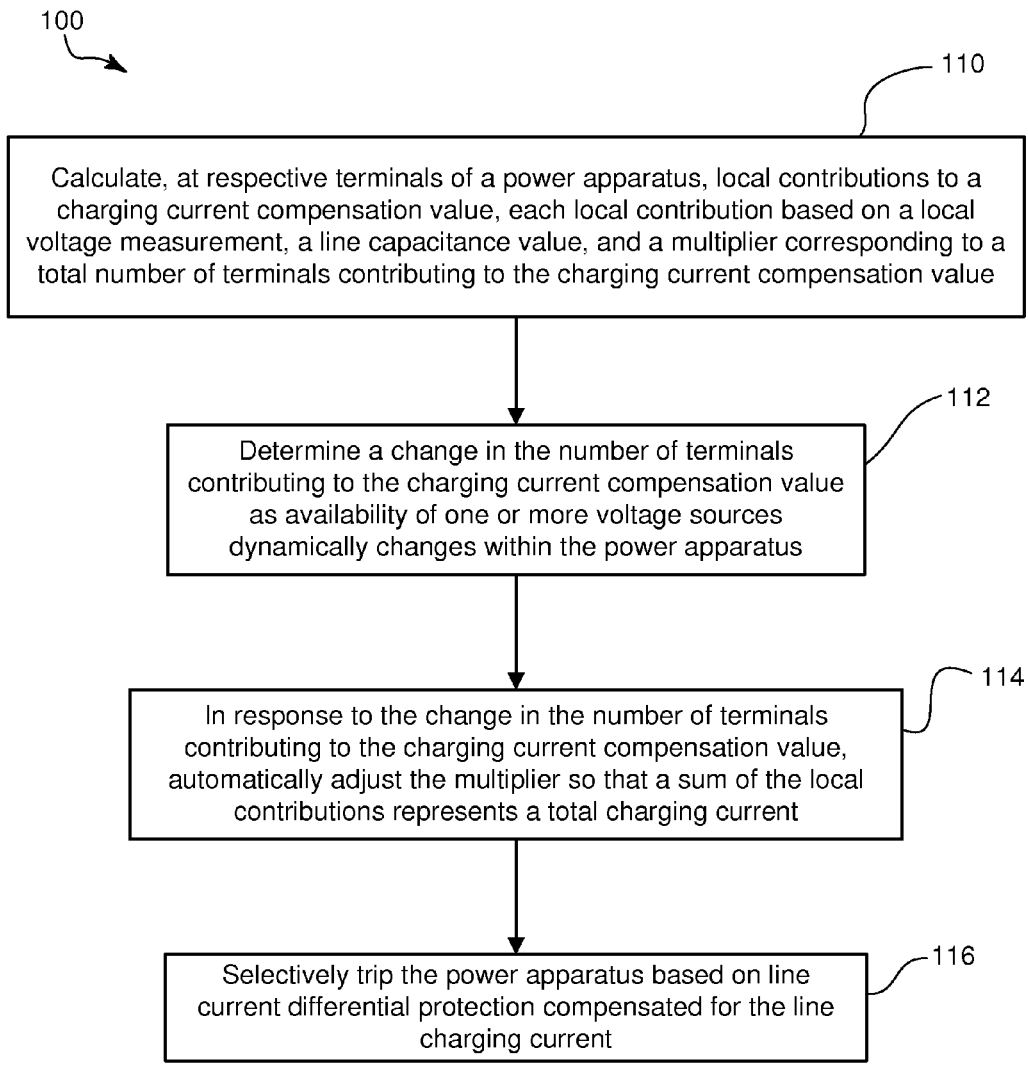
FIG. 1 is a flow diagram of a method for current differential protection using charging current compensation according to one embodiment.

Line charging current compensation is a useful function of a line current differential relay. High voltage overhead lines may draw about 1 A per each km of length (about 1.6 A per mile). For high voltage cables and ultra high voltage overhead lines, the total charging current may add to hundreds of primary amperes. In some cases, the charging current may be comparable with the fault current.

Generally, line charging current demonstrates itself as a spurious differential signal in a line current differential protection system and may impact both security and sensitivity of differential protection when applied to long lines or cables. With respect to security, a differential protection function may need to be intentionally de-sensitize by setting its pickup threshold above the total line charging current to ensure no operation under single end feed condition. This impacts sensitivity. In another aspect, the capacitive charging current decreases the inductive fault current in the inputs measured by the relay during internal faults, reducing sensitivity in yet another way.

Line charging current may affect phase and sequence differential elements in both steady state and during transients. However, line charging current may impact a phase differential element more than it impacts a sequence element (e.g., a negative-sequence element or zero-sequence element). Consider, for example, line energization, external faults, and internal faults in the context of the line charging current. During line energization of a power apparatus that includes a transmission line, an energizing terminal draws the total charging current. If the energizing voltage is balanced and the line is well transposed, the charging current is of positive sequence and affects only the phase elements.

If the line and/or the supply voltage are unbalanced, an unbalanced charging current may flow. As the charging current is fed from one terminal only, it appears as a single-feed current and as such it generally cannot be addressed using known restraint methods. Increasing the pickup permanently above the charging current, or using the remote breaker status to temporarily boost security are ways of dealing with the line charging current during energization.

If the line is not well transposed and the total charging current is high, one may have to increase the pickup of the negative-sequence and zero-sequence functions considerably, potentially diminishing their natural high sensitivity of protection.

During external faults, changes in voltages induce extra charging current. This includes both fault inception and clearance. As the fault voltages are unbalanced, symmetrical charging currents may be induced, which may impact the negative-sequence and zero-sequence functions. This situation may not be a major concern, however, as the external fault current produces restraints for all three differential functions (phase, negative-sequence, and zero-sequence). These restraint terms allow counterbalancing the charging current component in the differential current. Weak systems may pose some challenge as they do not generate large currents that would boost restraints, but allow voltages to depress considerably creating larger charging currents.

During internal faults, the charging current caused by the change in voltages subtracts from the fault current potentially reducing sensitivity of applied protection. Typically, this is not a major concern for the negative-sequence and zero-sequence functions because high sensitivity is required during high resistance ground faults, and these faults generally do not change voltages much. Therefore, only small zero- and negative-sequence charging currents are generated during high resistance faults. However, if the pickup settings are increased to deal with energization of a poorly transposed line, sensitivity may be impacted.

Line charging current may not be a major concern for the negative-sequence and zero-sequence functions, unless the line is not well transposed or is operated under considerable unbalance, for example caused by single phase reactor operation. If high sensitivity is required from the phase differential function, line charging current is, however, a significant concern.

Generally, a value of the line charging current may be calculated based on the measured voltages and the equivalent capacitance of the protected line. Using voltages to compensate the current differential function creates a dependency on voltage measurements, which jeopardizes dependability of protection when the voltage inputs become unavailable such as under loss of potential conditions, or when bus-side VTs are used and the line is opened (disconnected from the bus via an open breaker or disconnect switch).

Thus, according to certain embodiments disclosed herein, a line current differential system compensates for line charging current even as some voltage sources become unavailable. The system continues to compensate for line charging current as long as a single voltage measurement is available at one of the terminals of a multi-terminal apparatus that includes a transmission line being protected.

In one embodiment, as discussed in detail below, each relay of a line differential protection system that normally has access to voltage calculates phase charging currents based on measured phase voltages and capacitances of the transmission line. A relay may calculate the charging currents, for example, using instantaneous values of the voltage and calculating instantaneous values of the current based on the dv/dt principle, which is the instantaneous rate of voltage change over time used in applying Ohm's law to capacitances. In other embodiments, the relay may use phasors to calculate the charging currents. The line capacitance may be represented by the positive- and zero-sequence values, or with more precision (e.g., for untransposed lines) by a 3×3 matrix describing the voltage—charging current relationship for a three-phase line.

Each terminal determines an appropriateness of its local voltage for use in the charging current compensation. For example, the voltage is flagged as inappropriate upon loss of potential (e.g., a voltage transformer (VT) fuse fails), or when a bus VT is used but the line is disconnected from the bus. If the voltage is flagged as inappropriate, the relay suspends the operation of subtracting its share of the charging current. At the same time, the relay asserts a flag informing other relays of the line differential system that this terminal is not compensating. The flag may be referred to herein as a charging current compensation (CCC) flag.

As long as the line current differential system measures a voltage at one or more line terminals, the line current differential system continues providing charging current compensation. Each terminal sends a packet with charging current subtracted (CCC=1) or not subtracted in the transmitted currents (CCC=0). Any receiving terminal knows if the peers applied their share of compensation and adjusts its share accordingly (e.g., by changing a multiplier) so that the total differential current continues to be compensated for the full line capacitance.

When the multipliers are switched due to a change in the number of terminals contributing to the charging current compensation, a brief race condition may occur due to communication latencies where the sum of all the multipliers in the system may differ from a normal value of 1.00. Also, there may be a delay (fraction of a power cycle) when detecting a loss of potential condition that results in the usage of an erroneous voltage for charging current calculations for a period of time. Thus, certain embodiments disclosed herein compensate for these race conditions.

For example, to compensate for the race conditions, one embodiment adds an extra term to the restraint upon switching the multiplier. This extra term may be proportional to the error made when switching the multipliers. For example, the extra term may be the absolute value of $abs(1/M_{NEW} - 1/M_{OLD}) * I_{CHARGING\_TOTAL\_MAG}$, where $M_{NEW}$ is the new multiplier, $M_{OLD}$ is the old multiplier, and $I_{CHARGING\_TOTAL\_MAG}$ is the magnitude of the total charging current. For example, when switching the multiplier from $1/3$ to $1/2$, or vice versa, the absolute value of $(1/2-1/3)=1/6^{th}$ of the magnitude of the total charging current is added to the restraint. The extra term is kept in place for a pre-defined period of time (e.g., two cycles) so that the system switches from one set of compensating relays to a different set seamlessly.

In addition, or in other embodiments, line charging current compensation is used with an alpha plane to determine internal faults. After the line charging current is subtracted from the differential current, the adjusted differential current and a restraining current are used, as discussed in detail below, to calculate a first equivalent current and a second equivalent current of a two-terminal equivalent power apparatus. A complex current ratio of the first equivalent current and the second equivalent current are then applied to the alpha plane.

The equivalent alpha plane may be used with line charging current compensation regardless of the method used to determine the value of the line charging current. In other words, the embodiments disclosed herein for mitigating dependence on the availability of voltage sources are not required in every embodiment that uses the equivalent alpha plane with charging current compensation. Similarly, an artisan will recognize from the disclosure herein that embodiments disclosed herein for determining the line charging current with mitigated dependence on voltage sources may be used with a percentage differential function, rather than using the equivalent alpha plane.

The embodiments disclosed herein allow a user to easily configure a line current differential system to provide charging current compensation that works when voltage signals become permanently or temporarily unavailable without the need for further user intervention. At any given time, each terminal knows how many terminals compensate and adjusts its multiplier accordingly.

For illustrative purposes, certain example embodiments disclosed herein provide protection for a power apparatus that includes a power transmission line. An artisan will recognize from the disclosure herein that the disclosed principles may be applied to any protected plant or multi-terminal power apparatus that generates a charging current. As used herein, a "power apparatus" is a broad term that includes its normal and customary meaning and may include, for example, an overhead power transmission line or an underground cable, a power bus, a large motor, a generator, a transformer, a combination of the foregoing, or any other device or devices that may be removed from a power system (e.g., using breakers and/or relays) when a fault is detected. A power system, for example, may be divided into zones of protection to allow for the removal of a minimal amount of equipment from the power system during a fault condition. Each zone may be associated with its own protection system such that a fault within a particular zone causes the corresponding protection system to operate, whereas a fault in another zone will not cause the protection system to operate. The zone boundaries may be defined by the location of measuring points (e.g., current transformers) and circuit breakers that operate to isolate the zone.

An alpha plane protection system is disclosed in U.S. Pat. No. 6,518,767, titled "Line Differential Protection System for a Power Transmission Line," which is assigned to the assignee of the present disclosure, and which is hereby incorporated herein for all purposes. The alpha plane current differential protection principle (or alpha plane principle) disclosed in U.S. Pat. No. 6,518,767 provides a line differential protection system that, while still dependent upon a communication channel, includes significant improvements relative to other system considerations, including high fault resistance coverage and improved operating characteristics and sensitivity, while at the same time maintaining power system security.

The embodiments of the disclosure will be best understood by reference to the drawings, wherein like elements are designated by like numerals throughout. In the following description, numerous specific details are provided for a thorough understanding of the embodiments described herein.

However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or detailed description is for illustrative purposes only and is not meant to imply a required order, unless specified to require an order.

Embodiments may include various steps, which may be embodied in machine-executable instructions to be executed by a general-purpose or special-purpose processor or computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform the processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/computer-readable medium suitable for storing electronic instructions.

Charging Current Compensation Under Dynamically Changing Conditions

As discussed above, line charging current compensation removes the charging current from the differential signal. The method applied for charging current compensation should work under balanced and unbalanced conditions, for transposed and untransposed lines, during energization, during external and internal faults, and during other events. In one embodiment, a line current differential system compensates for line charging current as voltage sources become dynamically unavailable or available to the protection scheme of a power apparatus. For example, voltages sources may become "unavailable" or otherwise inappropriate for use in determining line charging current during a loss of potential condition, or when bus-side potential transformers are used and the line is opened (disconnected from the bus via an open breaker or disconnect switch).

In one embodiment, a current differential protection system provides charging current compensation in which fractions of the charging current are estimated by each relay of the protection system based on local voltages only. The system deals with the loss of a voltage source by using the remaining system voltages and adjusting multipliers used at remaining compensation points to reflect the total charging current. The local fraction of compensation is suppressed when the local voltage source is not available. Each terminal adjusts its multiplier for its local fraction of the charging current based on status information included in exchanged communication packets that indicate which of the remote currents are compensated for charging current.

FIG. 1 is a flow diagram of a method 100 for current differential protection using charging current compensation according to one embodiment. The method 100 includes calculating 110, at respective terminals of a power apparatus, local contributions to a charging current compensation value. Each local contribution is based on a local voltage measurement, a line capacitance value, and a multiplier corresponding to a total number of terminals contributing to the charging current compensation value.

The method 100 further includes determining 112 a change in the number of terminals contributing to the charging current compensation value as availability of one or more voltage sources dynamically changes within the power apparatus. In response to the change in the number of terminals contributing to the charging current compensation value, the method 100 automatically adjusts 114 the multiplier so that a sum of the local contributions represents a total charging current. The method 100 further includes selectively tripping 116 the power apparatus based on line current differential protection compensated for the line charging current.

Figure 2:
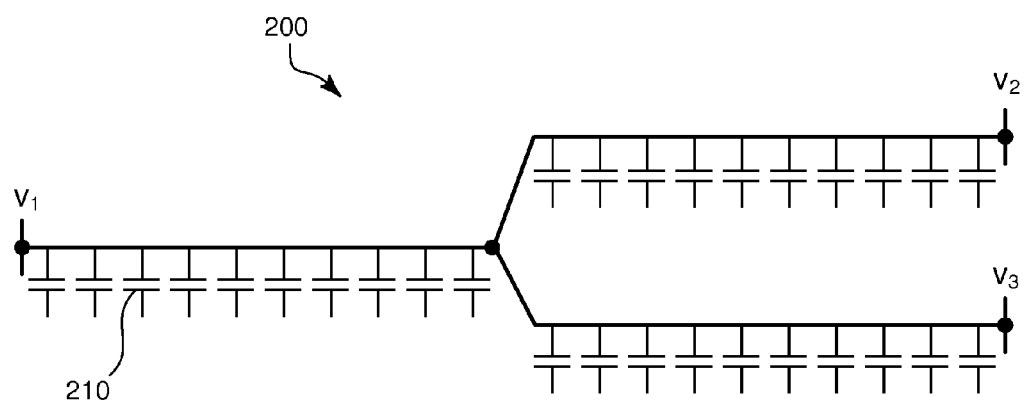
FIG. 2 schematically illustrates a distributed capacitance model of a three-terminal transmission line that may be used with certain embodiments.

The line capacitance value used as part of the calculation 110 of a local contribution to a charging current compensation value is an estimated total line capacitance based on a distributed line model or a lump parameter line model. For example, FIG. 2 schematically illustrates a distributed capacitance model of a three-terminal transmission line 200 that may be used with certain embodiments. A first voltage $v_1$ is applied to a first terminal, a second voltage $v_2$ is applied to a second terminal, and a third voltage $v_3$ is applied to a third terminal of the multi-terminal transmission line 200. For illustrative purposes, a capacitance model 210 is shown distributed along the multi-terminal transmission line 200.

The multi-terminal transmission line 200 draws a charging current through its distributed capacitances 210. The exact distribution of this current depends on line and system parameters, as well as on the voltage profile along the multi-terminal transmission line 200 and its segments. Higher voltages draw larger charging currents. Open ended lines may develop an overvoltage at the open end while not drawing any current from the open end. During faults (e.g., internal or external faults), voltages change and become unbalanced causing changes in the charging current, with the charge flowing out and into the multi-terminal transmission line 200.

From the differential protection point of view, however, the total charging current may be of more interest than the components of the total charging current fed from the individual line terminals. Thus, in certain embodiments, the total line charging current is approximated as a current drawn by the total line capacitance under an average line voltage. The total line capacitance is a known parameter, or may be easily determined based on the line design or measurements, and may be a user setting provided to the differential protection system. The average line voltage may be calculated from the measured line terminal voltages.

Figure 3:
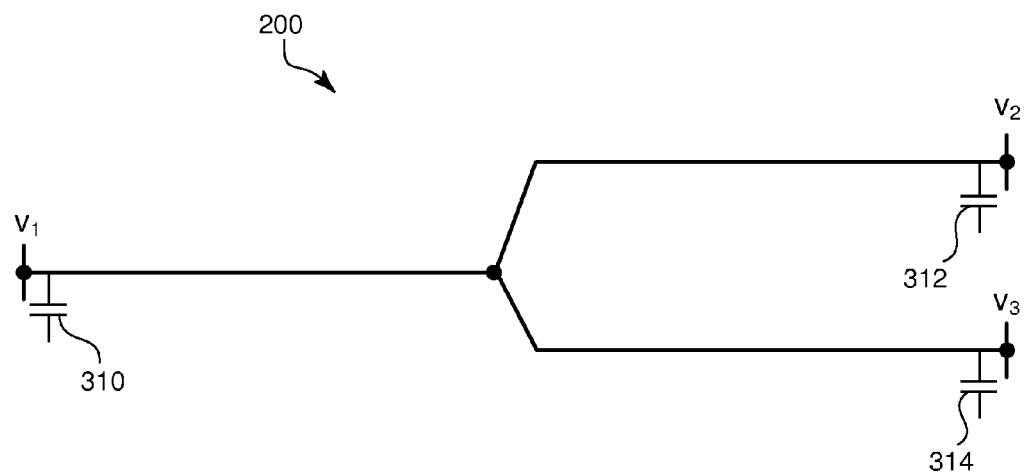
FIG. 3 schematically illustrates a lumped parameter model of the transmission line shown in FIG. 2 that may be used in certain embodiments.

FIG. 3 schematically illustrates a lumped parameter model of the transmission line 200 shown in FIG. 2 that may be used in certain embodiments. As shown in FIG. 3, the line capacitance may be represented by a lump parameter model 310, 312, 314 at each terminal of the multi-terminal transmission line 200 that allows the line current differential relay to measure the voltage. Thus, in one embodiment, the total charging current $i_{C\_TOTAL}$ is represented by:

$$i_{C\_TOTAL} = C_{TOTAL} \cdot \frac{d}{dt} v_{AVERAGE}, \quad (1)$$

where $C_{TOTAL}$ is the total line capacitance, and $v_{AVERAGE}$ is the average line voltage calculated from measured line terminal voltages $v_1$, $v_2$, $v_3$.

The average line voltage can be approximated by the average terminal voltage, and therefore:

$$i_{C\_TOTAL} = C_{TOTAL} \cdot \frac{1}{3} \cdot \frac{d}{dt}(v_1 + v_2 + v_3). \quad (2)$$

Rearranging further:

$$i_{C\_TOTAL} = \frac{1}{3} \cdot C_{TOTAL} \cdot \frac{d}{dt} v_1 + \frac{1}{3} \cdot C_{TOTAL} \cdot \frac{d}{dt} v_2 + \frac{1}{3} \cdot C_{TOTAL} \cdot \frac{d}{dt} v_3. \quad (3)$$

In other words the total charging current is the sum of three components:

$$i_{C\_TOTAL} = i_{C1} + i_{C2} + i_{C3}, \quad (4)$$

which are each derived from a single line terminal voltage:

$$i_{C1} = \frac{1}{3} \cdot C_{TOTAL} \cdot \frac{d}{dt} v_1, \quad (5)$$

$$i_{C2} = \frac{1}{3} \cdot C_{TOTAL} \cdot \frac{d}{dt} v_2, \quad (6)$$

$$i_{C3} = \frac{1}{3} \cdot C_{TOTAL} \cdot \frac{d}{dt} v_3. \quad (7)$$

The equations (1)-(7) show how each terminal calculates a share of the total charging current based on a local voltage and a portion of the total line capacitance proportional to the total number of line terminals that perform the compensation at any given time. These shares of the charging current, when added up in the final differential current, substantially null the actual charging current.

Accordingly, the line current differential system effectively calculates the charging current based on the average voltage from all line terminals, without sending any voltages between the relays. Instead, each terminal subtracts its share of the charging current from the measured current and sends it to its peers as:

$$i_{TX} = i_{MEASURED} - i_C, \quad (8)$$

where $i_{TX}$ is the current transmitted by the local terminal to its peers (e.g., remote terminals), $i_{MEASURED}$ is the current measured by the local terminal (which may be a partial differential current), and $i_C$ is the local contribution to the charging current compensation value. Each terminal also calculates the overall line differential current $i_{DIF}$ as:

$$i_{DIF} = i_{TX} + \Sigma i_{RX}, \quad (9)$$

where $i_{RX}$ is the current received from a peer.

Using the FIG. 3 as an example, the differential current is calculated as follows:

$$i_{DIF} = (i_{MEASURED1} - i_{C1}) + (i_{MEASURED2} - i_{C2}) + (i_{MEASURED3} - i_{C3}), \quad (10)$$

or $$i_{DIF} = i_{MEASURED1} + i_{MEASURED2} + i_{MEASURED3} - (i_{C1} + i_{C2} + i_{C3}), \quad (11)$$

or $$i_{DIF} = i_{MEASURED1} + i_{MEASURED2} + i_{MEASURED3} - i_{C\_TOTAL}. \quad (12)$$

The share of the charging current estimated at a given terminal may not be closely related to the actual charging current supplied by the given terminal. At an open line end, for example, the actual current supplied by the open terminal is zero, while the open terminal estimates its share of the total charging current based on the voltage at the open end, providing line-side VTs are installed. At the same time, a closed terminal will underestimate its share. When added up in the differential calculations, all the estimates of the charging current substantially match the actual total charging current of the line.

In general, for a line with T terminals performing charging current compensation, where T is a subset of N total number of terminals (and T=N if all of the terminals measure a respective voltage suitable for use with the charging current compensation), each terminal uses 1/T of the total line capacitance and its own voltage to estimate its share of the charging current compensation value. Thus, the multipliers all add up to about 1.00.

Figure 4:
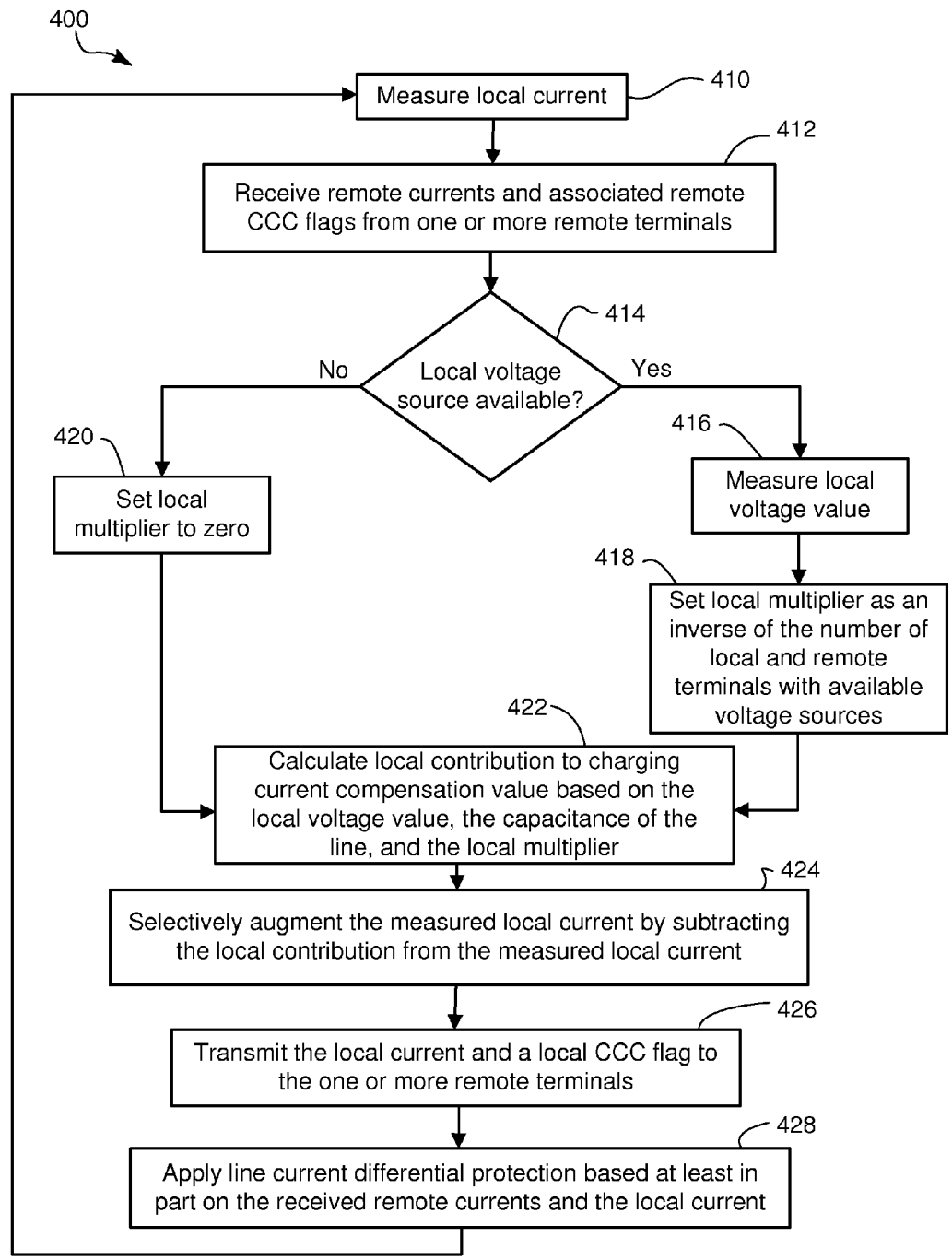
FIG. 4 is a flow diagram of a method for charging current compensation performed by a local terminal in a current differential protection system according to one embodiment.

In summary, FIG. 4 is a flow diagram of a method 400 for charging current compensation performed by a local terminal in a current differential protection system according to one embodiment. The method 400 includes measuring 410 a local current and receiving 412 remote currents and associated remote CCC flags from one or more remote terminals. The local terminal then queries 414 whether a local voltage source is available. If the local voltage source is available, then the local terminal measures 416 a local voltage value and sets 418 a local multiplier as an inverse of the number of local and remote terminals with available voltage sources. The number of remote terminals with available voltage sources is determined from the remote CCC flags. If, however, the local voltage source is unavailable, the local terminal sets 420 the local multiplier to zero.

The local terminal then calculates 422 a local contribution to the charging current compensation value based on the local voltage value and the local multiplier, and selectively augments 424 the measured local current by subtracting the local contribution from the measured local current. If, for example, the local multiplier is zero (because the local voltage source is unavailable), then the local contribution becomes zero and nothing is subtracted from the measured local current value. The local terminal then transmits 426 the local current and a local CCC flag to the one or more remote terminals. The local CCC flag indicates whether or not the local terminal contributes to the overall charging current compensation (e.g., whether or not the local terminal subtracted a non-zero value from the transmitted local current value). The local terminal then applies 428 line current differential protection based at least in part on the received remote currents and the local current. As discussed below, the line current differential protection in one embodiment includes an equivalent alpha plane analysis.

Example Three-Phase Embodiment

As indicated by equations (1)-(3), the charging current is calculated as a derivative of the voltage signal assuming known capacitance of the line. A microprocessor-based relay according to one embodiment uses digital filtering to derive the time derivative numerically. For example, in one embodiment, a replica charging current is derived from raw 8 kHz samples using a numerical differentiator in the form of a short window finite impulse response (FIR) filter. Such an embodiment may be well suited, for example, for implementation in a field programmable gate array (FPGA). In one embodiment, the three-point filter used (from newest to oldest sample in the window):

$$h_{CC} = G * [½, -2, ½],\qquad(13)$$

where G is selected to give a unity gain at a fundamental frequency. For example, G=21.20497 if the fundamental frequency is 60 Hz, and G=25.45171 if the fundamental frequency is 50 Hz. An artisan will recognize from the disclosure herein that these numerical values are provided by way of example only, and not by limitation. Further, other types of digital filtering may be used. In certain embodiments, any filter is sufficient that acts as a differentiator (time derivative) in a frequency range between about 0 Hz and about 400 Hz.

In general, the following equation is used to calculate the phase charging currents for phases A, B, and C:

$$\begin{bmatrix} i_A \\ i_B \\ i_C \end{bmatrix}_C = \begin{bmatrix} C_{AA} & C_{AB} & C_{AC} \\ C_{BA} & C_{BB} & C_{BC} \\ C_{CA} & C_{CB} & C_{CC} \end{bmatrix} \cdot \frac{d}{dt} \begin{bmatrix} v_A \\ v_B \\ v_C \end{bmatrix} \qquad(14)$$

For fully transposed lines, the 3×3 capacitance matrix is symmetrical and includes the self- and mutual-capacitances calculated from the zero- and positive-sequence susceptances of the line. For un-transposed lines, the capacitance matrix is not symmetrical and extra settings (in addition to the zero- and positive-sequence susceptances) are used to determine the capacitance matrix and perform accurate compensation. Data used for the compensation is typically available from the commissioning records of the protected line.

Symmetrical components of the charging current are compensated for automatically by compensating the phase currents using equation (14).

Equation (14) is a time domain implementation of a charging current compensation method. Thus, instantaneous values of the differential current are compensated (e.g., not only the fundamental frequency component). This allows various algorithms that respond to signal features, other than the fundamental frequency component, to work well.

Note that the implementation method (14) works well under variety of system conditions: energization, faults, open pole conditions, and other system events.

A Simulation Example

The following example illustrates an embodiment of energizing a three-terminal 275 kV line, with a total length of 300 km and a steady state positive-sequence charging current of 230 A. In this example, all signals are filtered with a second-order Butterworth filter with a corner frequency of 600 Hz. The line is energized from the third terminal. The numerical values and graphs associated with this embodiment are provided by way of example only, and not by limitation.

FIG. 5A graphically illustrates waveforms of voltages and FIG. 5B graphically illustrates waveforms of calculated shares of the charging current calculated by the first terminal in the simulation example embodiment. Different waveforms are provided for phase A, phase B, and phase C of a three-phase system. Note that in this example, an actual charging current drawn from this terminal is zero (open breaker).

FIG. 6A graphically illustrates waveforms of voltages and FIG. 6B graphically illustrates waveforms of calculated shares of the charging current calculated by the second terminal in the simulation example embodiment shown in FIGS. 5A and 5B. Again, in this example, the actual current supplied by this terminal is zero.

FIG. 7A graphically illustrates waveforms voltages and FIG. 7B graphically illustrates waveforms of calculated shares of the charging current calculated by the third terminal in the simulation example embodiment shown in FIGS. 5A, 5B, 6A, and 6B. Note that in this example, the third terminal supplies the actual charging current, and the third terminal's calculated share of the charging current is about one-third of the actual current.

Figures 8A, 8B:
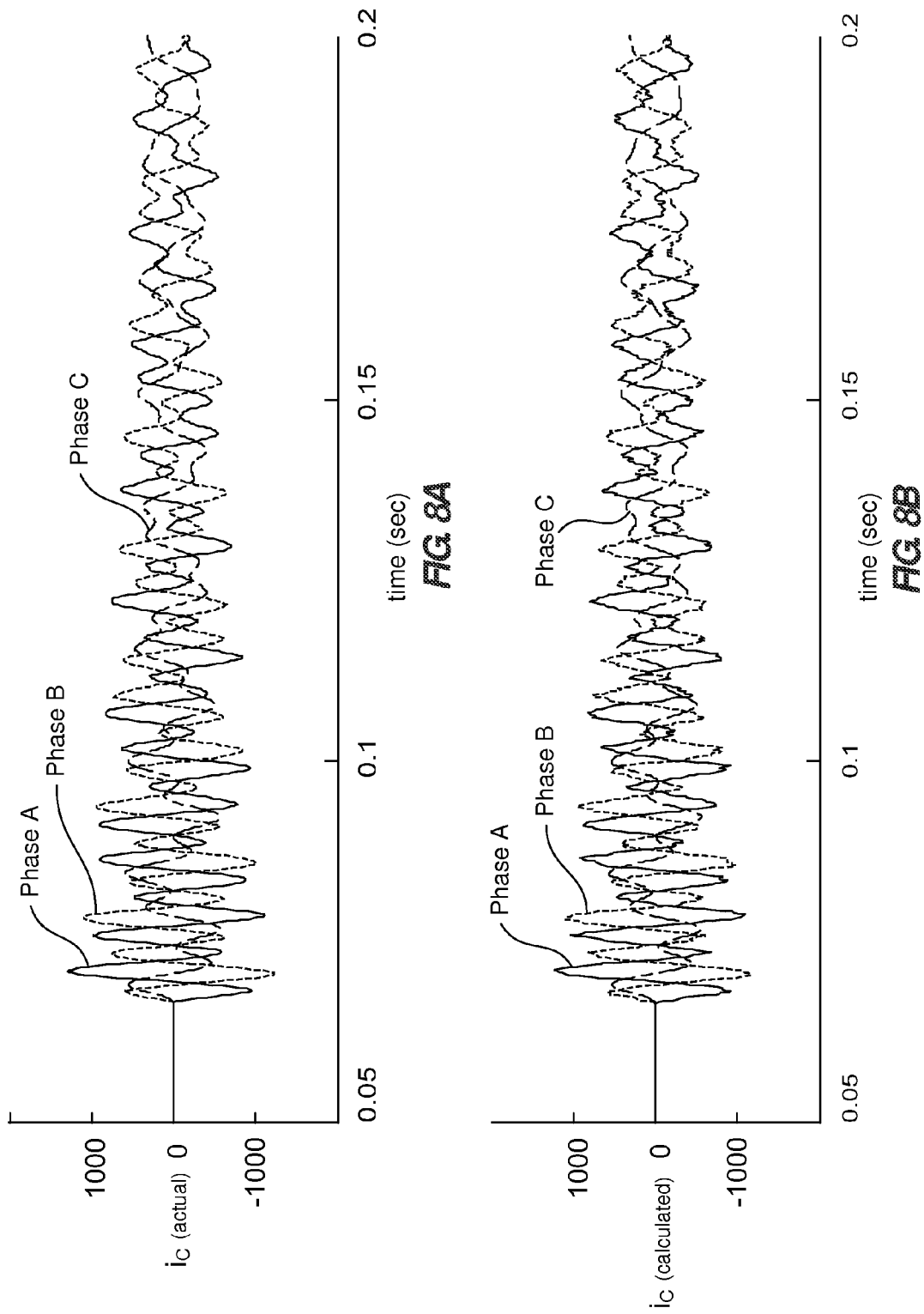
FIG. 8A graphically illustrates waveforms of actual charging currents and FIG. 8B graphically illustrates waveforms of calculated charging currents for the simulation example embodiment shown in FIGS. 5A, 5B, 6A, 6B, 7A, and 7B.

FIG. 8A graphically illustrates waveforms of actual charging currents and FIG. 8B graphically illustrates waveforms of calculated charging currents for the simulation example embodiment shown in FIGS. 5A, 5B, 6A, 6B, 7A, and 7B. The actual charging currents shown in FIG. 8A are the currents measured at the energizing terminal (terminal 3 in this example). The calculated charging currents shown in FIG. 8B are the total of the charging current shares calculated at each of the line terminals. As shown in FIGS. 8A and 8B, the calculated charging currents correspond closely to the actual charging currents in this example.

To illustrate the effect and accuracy of the compensation in this example, FIGS. 9A, 9B, and 9C compare the respective differential currents without compensation (dashed lines) and with compensation (solid lines). FIG. 9A graphically illustrates a differential current waveform without compensation 910 and a differential waveform with compensation 912 for phase A according to the example embodiment shown in FIGS. 5A, 5B, 6A, 6B, 7A, and 7B. FIG. 9B graphically illustrates a differential current waveform without compensation 914 and a differential waveform with compensation 916 for phase B according to the example embodiment shown in FIGS. 5A, 5B, 6A, 6B, 7A, and 7B. FIG. 9C graphically illustrates a differential current waveform without compensation 918 and a differential waveform with compensation 920 for phase C according to the example embodiment shown in FIGS. 5A, 5B, 6A, 6B, 7A, and 7B. In FIGS. 9A, 9B, and 9C, the differential current without compensation 910, 914, 918 is the current measured at the energizing terminal. The differential current with compensation 912, 916, 920 is the current calculated following equations (8) and (9) that is from the partial differential terms sent by each relay. Note that in this example a vast portion of the charging current is removed from the differential signal, and the remainder is of higher frequencies that may be further suppressed according to certain embodiments, by relay filtering algorithms.

Accuracy of Compensation

As discussed above, in some embodiments, a line charging compensation method uses a lumped parameter model to estimate and subtract the line charging current. This lumped model represents actual transmission lines well for frequencies up to few hundred hertz. The lumped parameter model may deviate, however, from actual line parameters at higher frequencies.

Figure 10:
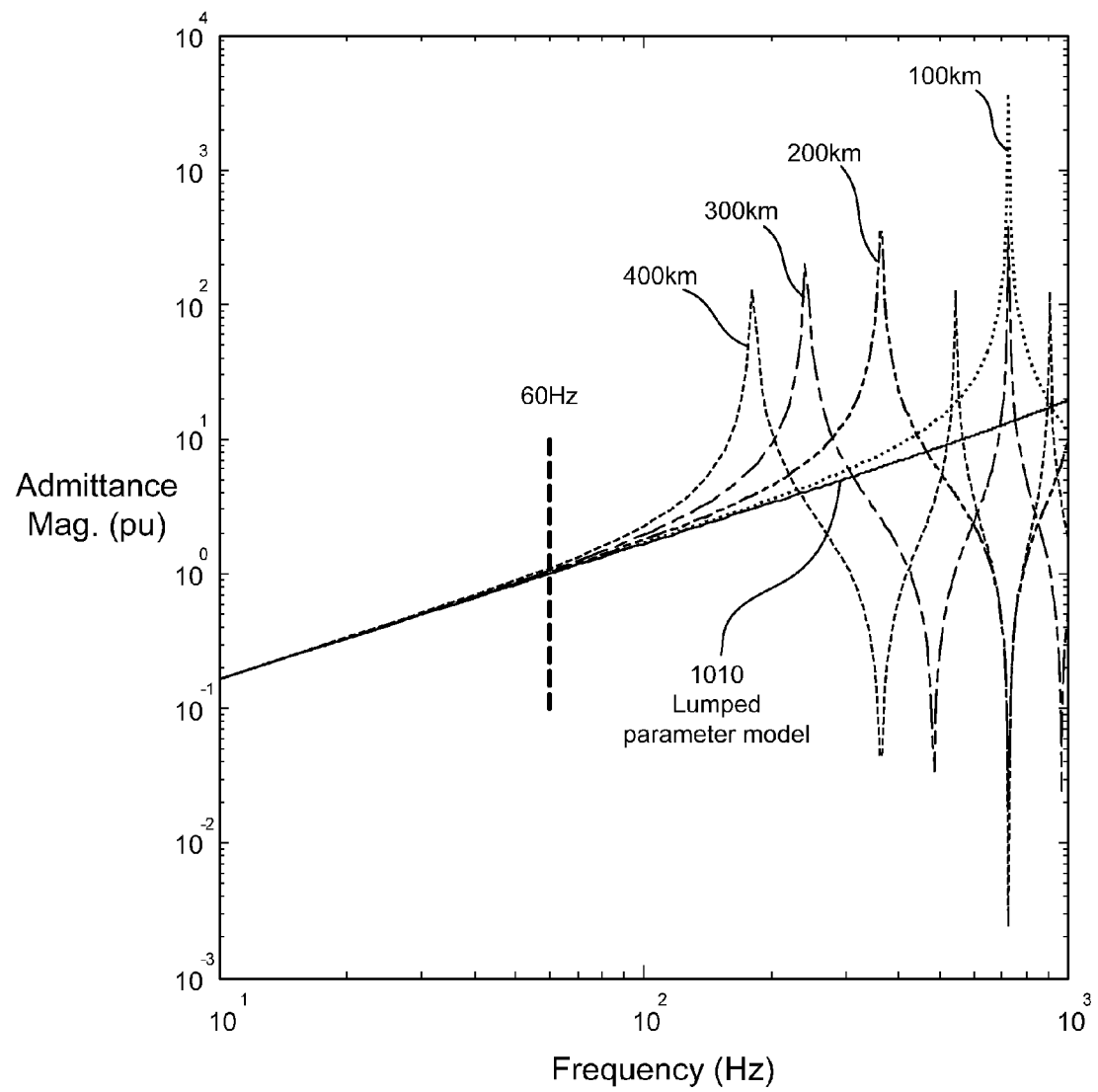
FIG. 10 graphically illustrates a frequency response of an admittance of a sample overhead line for a few different line lengths superimposed on a frequency response of the lumped parameter model according to one embodiment.

FIG. 10 graphically illustrates a frequency response of an admittance of a sample overhead line for a few different line lengths (100 km, 200 km, 300 km, and 400 km) superimposed on a frequency response of the lumped parameter model 1010 according to one embodiment. As shown in FIG. 10, significant discrepancy between the actual line and the lumped parameter model 1010 may occur for higher frequencies, particularly for long lines (and it is long lines that may benefit most from the charging current compensation).

In other embodiments, a more accurate model of the line (compared with the C*dv/dt) may be used in a line current differential relay. However, behavior of long transmission lines at higher frequencies may be difficult to model without a considerable amount of data. There are differences between overhead transmission lines and cables. Mixed lines with some cable and overhead sections may be difficult to cover with a more accurate model of the line. Line geometry, skin effects, zero-sequence resistance may also have an impact on the accuracy of the model. Thus, an approach using a more accurate model may put extra burden on the user. In addition, factoring in frequency responses of the VTs may increase the complexity.

Figure 11:
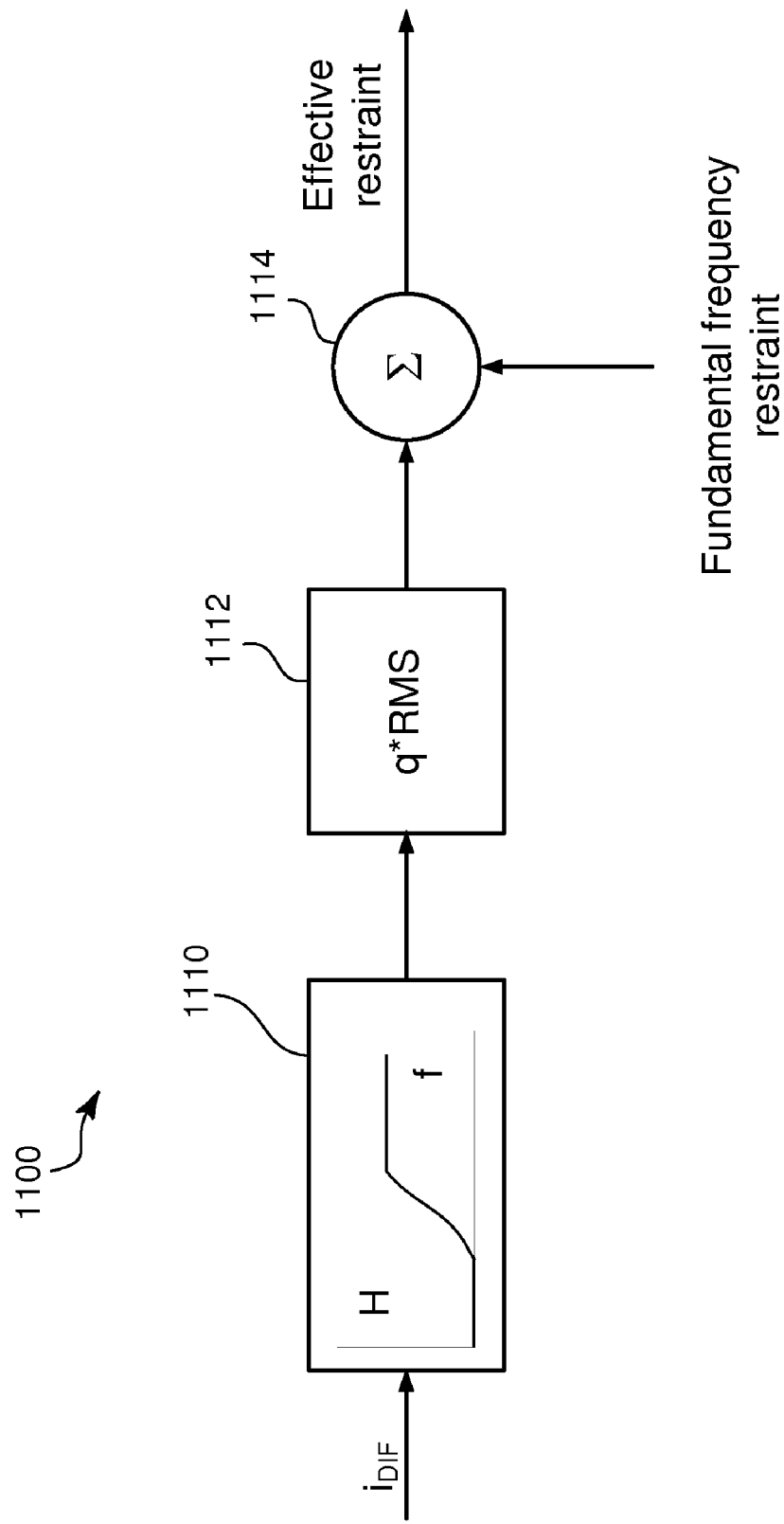
FIG. 11 is a block diagram of a module for generating an extra restraint term from the high frequency spectrum in the differential current according to one embodiment.

Further, the higher frequency components of the differential current resulting from over or under compensation of the charging current are not used for protection purposes and therefore may not need to be measured correctly in many embodiments. Instead, the under/overcompensated higher frequency components are noise impacting other measurements, and may be dealt with as such using known protection approaches. One way to deal with the under/overcompensated high frequency charging current components is to produce an extra restraint from the high frequency spectrum in the differential signal. For example, FIG. 11 is a block diagram of a module 1100 for generating an extra restraint term from the high frequency spectrum in the differential current according to one embodiment. The module 1100 includes a high-pass filter 1110, a root mean square (RMS) component 1112, and a summation component 1114. The high-pass filter 1110 extracts high frequency components from the differential signal. The RMS component 1112 determines an RMS value of the high frequency components. The RMS components may multiply the RMS value by a factor q so as to boost the fundamental frequency restraint. The factor q may be a design constant optimized based on performance of elements of the relay such as filtering of the operating signals, corner frequency of the high pass filter in FIG. 11. In this way, if the high frequency component affects measurements of the differential signal, it also automatically increases the corresponding restraint term. As a result, the equivalent alpha plane (discussed below) is kept secure.

Thus, in certain embodiments, the protection system removes the charging current for frequencies near the fundamental frequency as these frequencies affect the transient and steady state response of the relay, while the protection system provides an extra restraint derived from higher frequency components in the differential signal.

Treatment of Line Reactors

Long lines that benefit from charging current compensation embodiments disclosed herein may include shunt reactors installed in-zone given location of the CTs connecting the line current differential scheme. The capacitive current of the line and the inductive current of the reactors do not cancel transiently as far as fast protection is concerned. The transient nature (frequency response) is different between an inductor and a capacitor, the positive- to zero-sequence reactance ratios may be different between an inductor and a capacitor, and reactor saturation makes the inductance non-linear. In addition, reactors are switched on and off as a part of voltage/reactive power control in the power system and may be operated in an unbalanced way (one or two phases).

Figure 12:
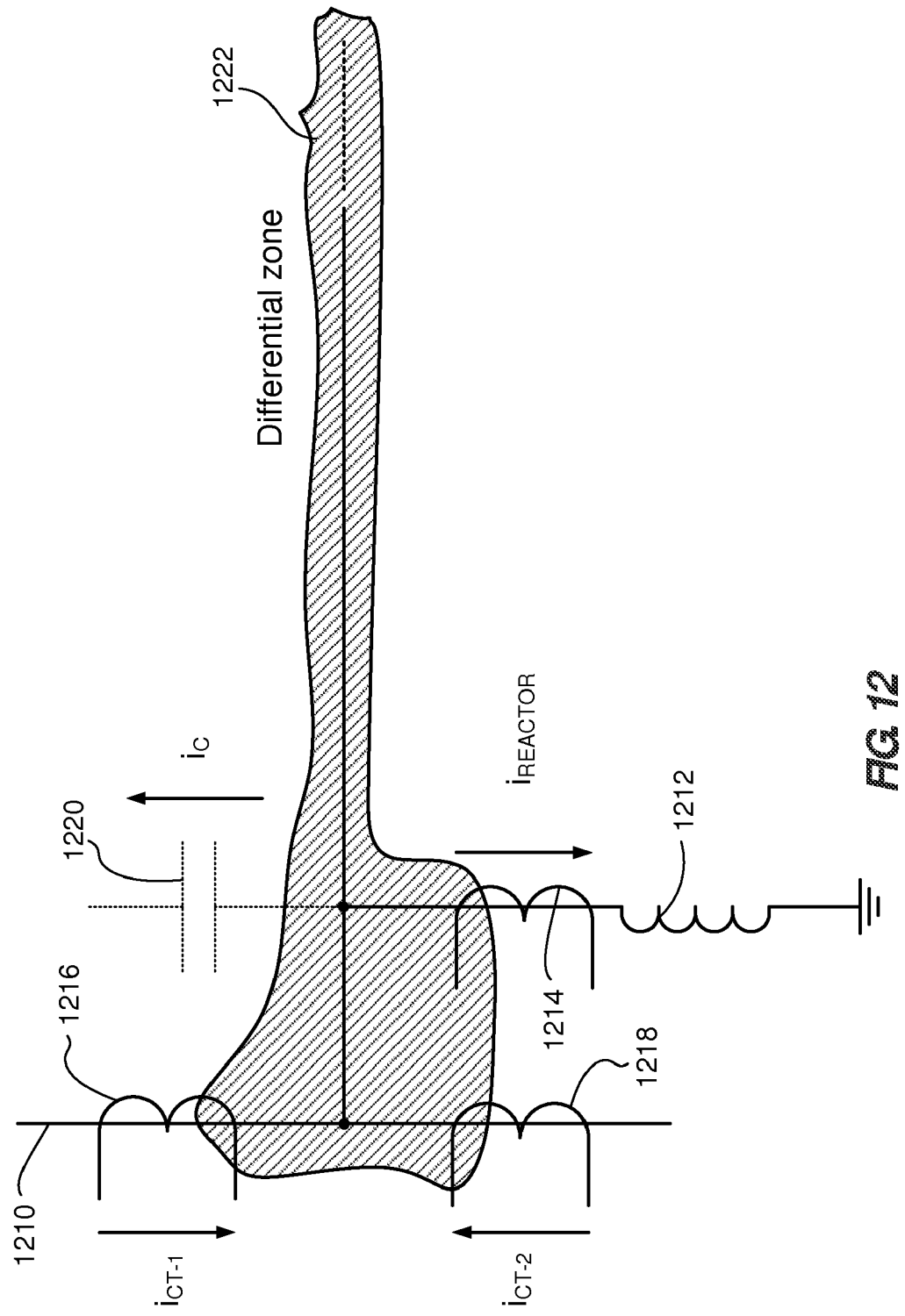
FIG. 12 schematically illustrates a power transmission line with a shunt reactor according to one embodiment.

In order to keep protection applications simple, according to certain embodiments, the reactor current is taken out of the measuring zone by paralleling the reactor's CTs with CTs of the line. At any given time, the line may or may not be compensated, but the relay measures the entire charging current and compensates for it. For example, FIG. 12 schematically illustrates a power transmission line 1210 with a shunt reactor 1212 according to one embodiment. The shunt reactor 1212 is associated with a CT 1214, and dual CTs 1216, 1218 are used to terminate the line 1210 as part of a line current differential scheme. As discussed above, a line capacitance 1220 is also associated with the line 1210. As shown in FIG. 12, when applying the line charging current compensation according to certain embodiments herein, a line differential zone 1222 excludes both a reactor current $i_{REACTOR}$ associated with the shunt reactor 1212 and the charging current $i_C$ associated with the line capacitance 1220.

Immunity to Voltage Transformer (VT) Problems

As discussed above, charging current compensation makes the line current differential function partially dependent on availability of the voltage sources and to a degree exposes it to problems with the voltage signals. Thus, dependence on voltage sources should be remedied as much as possible. Certain embodiments disclosed herein use an extra bit in the communication payload to signal if the terminal actually performs the compensation (e.g., the CCC flag discussed above).

A relay at a given terminal may not calculate and subtract its share of the charging current for the following reasons: VTs are not installed or not wired to the relay, a problem is detected with the VTs (loss of potential), and the charging current compensation logic suspends compensation based on this voltage, or bus-side VTs are used while the line breaker is opened and the logic suspends usage of this voltage as non-representative for the line.

Each set of received currents is either compensated or not as per the accompanying CCC flag. Each receiving terminal therefore knows how many terminals actually subtract their share of the charging current and can calculate its own share of compensation in order to make up for the full charging current of the line.

In this way the system works with variable number of compensating terminals and tolerates a loss of one or more sets of VTs.

Consider the following examples.

Example 1

Assume a three-terminal application and one terminal with no voltage source. The relay with no voltage does not compensate its currents and permanently sends CCC=0 to the other peers. Each of the receiving peers sees that the terminal does not compensate, and there is a total of two terminals that do compensate. As a result, each terminal that provides compensation applies a multiplier of ½ in their equations for the share of the charging current. In this way the charging current is compensated fully using an average of the two terminal voltages that are available to the line current differential system. Note that the terminal with no voltage still works with a fully compensated differential current.

Example 2

Assume a three-terminal application and one terminal with a bus-side voltage. Normally, each terminal performs the compensation by applying the multiplier of ⅓, and asserting the CCC bit. At the moment the terminal that uses a bus-side voltage detects any pole open, it de-asserts its CCC flag and ceases to compensate its current. The other two terminals recognize this change from the received CCC flag, switch their multipliers from ⅓ to ½, and the compensation continues using the two voltages that are representative of the line voltage profile.

Example 3

Continuing with the second example above, and assuming that subsequently one of the other terminals detects loss of potential. The other terminal that detects the loss of potential de-asserts its CCC flag and stops compensating its current. The only terminal with a healthy voltage now knows that the second peer lost the compensation, and switches its multiplier from ½ to 1. Thus, the compensation is performed using the single voltage that is still available to the line differential protection system. As such, the compensation may be less accurate, but still useful. The other two terminals still receive CCC=1 from the last terminal capable of compensation, and know the line differential current is compensated for the charging current.

The disclosed embodiments make the charging current compensation function more tolerant to problems with VTs in which individual relays in the line current differential system work as remote backup voltage sources for each other.

Charging Current Compensation and the Alpha Plane

Figure 13:
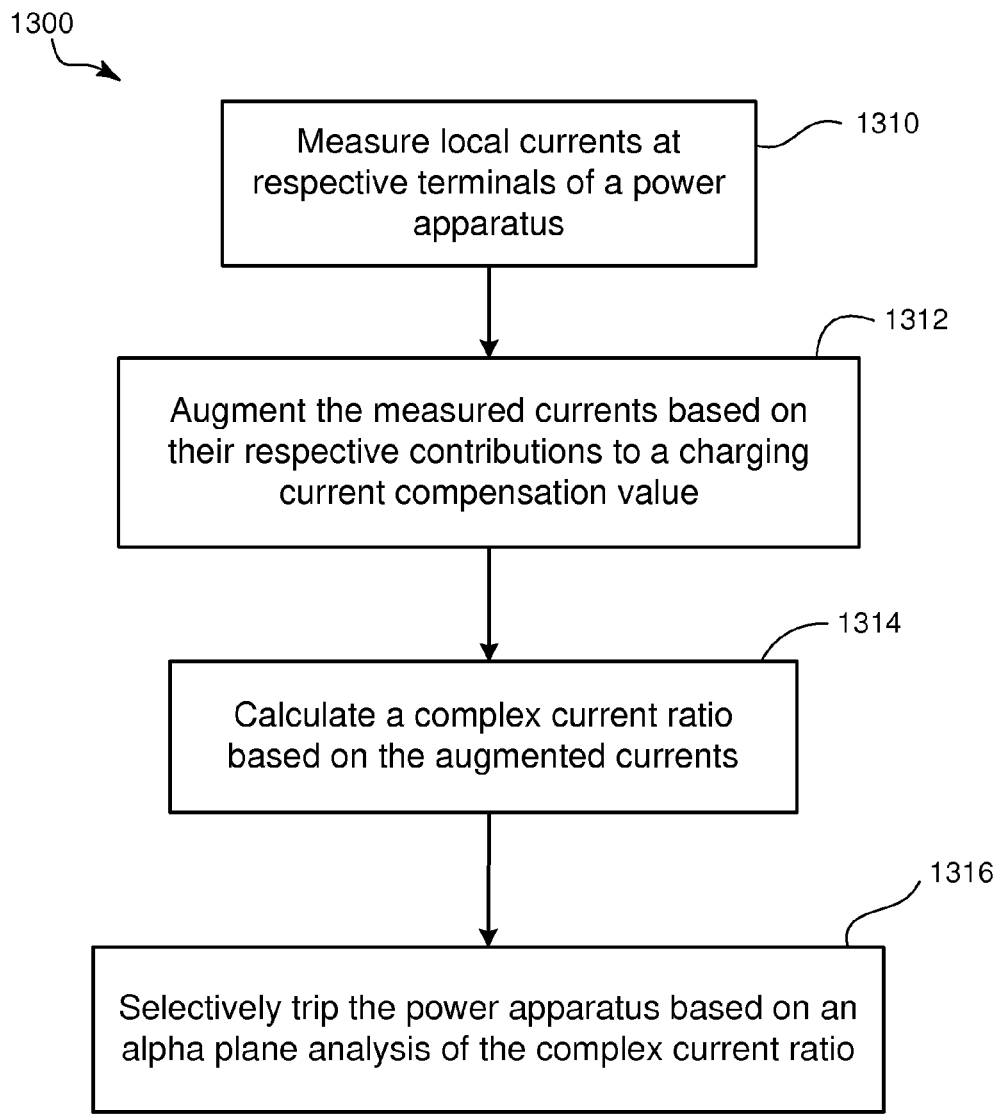
FIG. 13 is a flow diagram of a method for line current differential protection with charging current compensation using the alpha plane according to one embodiment.

In certain embodiments, the alpha plane is used with charging current compensation. For example, FIG. 13 is a flow diagram of a method 1300 for line current differential protection with charging current compensation using the alpha plane according to one embodiment. The method 1300 includes measuring 1310 local currents at respective terminals of a power apparatus, and augmenting 1312 the measured currents based on the respective contributions to a charging current compensation value. The determination of the charging current may be done using known methods or according to the systems and methods disclosed herein. The method 1300 then calculates 1314 a complex current ratio based on the augmented currents. As discussed in detail below, the alpha plane principle determines the presence of internal faults by analyzing a complex current ratio k of two currents. An internal fault is likely present if the complex current ratio k is in an operate region of the alpha plane. On the other hand, an internal fault is unlikely if the complex current ratio is in a restrain region of the alpha plane. Thus, the method 1300 further includes selectively tripping 1316 the power apparatus based on an alpha plane analysis of the complex current ratio.

As discussed below, the operating point on an equivalent alpha plane is derived from the differential and restraining auxiliary terms. By reducing the differential signal, the charging current compensation shifts the equivalent alpha plane operating point toward the blocking position. In an ultimate case of removing all the charging current, reducing the differential signal using charging current compensation yields the operating point of $1\angle 180°$ on the equivalent alpha plane. This is not only a desired result, but it happens without the knowledge of how the actual charging current divides between the terminals of the line.

During internal faults, charging current compensation increases the differential signal by not allowing its inductive component to be reduced by the capacitive charging current. This shifts the operating point on the equivalent alpha plane away from the blocking region as expected. As a result, the differential elements (phase in particular) may be set more sensitive when the charging current compensation is enabled.

A design question arises regarding adding the calculated charging current to the restraint terms. The actual charging current is measured by the relays and already contributes to the restraints. Thus, in such embodiments, the calculated charging current is the countermeasure and should not be included, or else the charging current would be counted twice in the restraining terms.

In order to illustrate this issue, consider the case of line energization example discussed above with respect to FIGS. 5A, 5B, 6A, 6B, 7A, and 7B. The actual charging current is measured at the third terminal and in the steady state produces about 230 A of phase restraint. At the same time, the compensated charging current is near zero. These values yield an operating point of approximately $1\angle 180°$ on the alpha plane, or a solid blocking indication. This shows that the charging current compensation allows the trip equations to restrain properly rather than to block via an elevated pickup setting.

Figure 14:
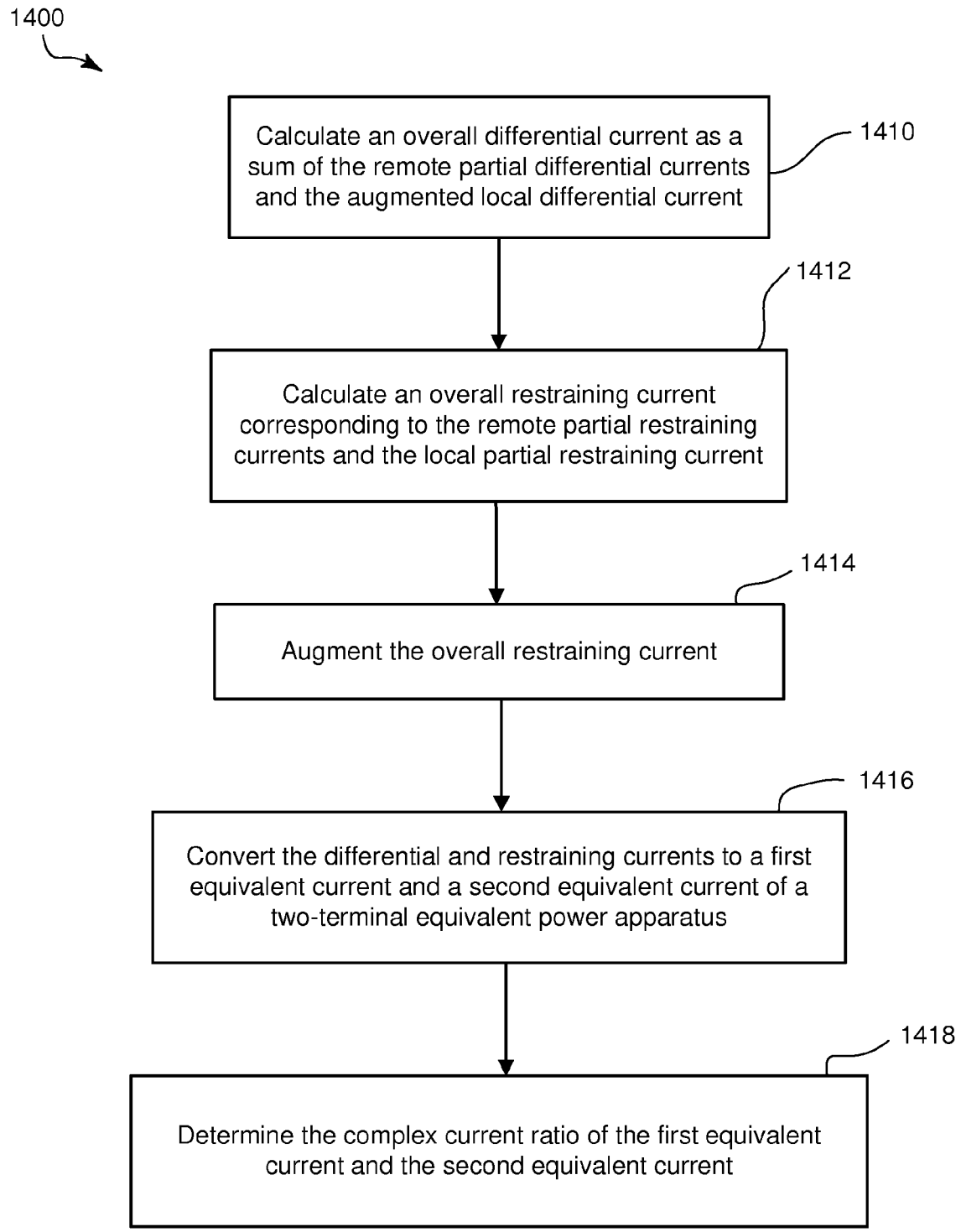
FIG. 14 is a flow chart of a method for charging current compensation with intentionally augmented restraining current using an equivalent alpha plane according to one embodiment.

In certain embodiments, charging current compensation may also be used with restraint (e.g., harmonic restraint) using the equivalent alpha plane. For example, FIG. 14 is a flow chart of a method 1400 for charging current compensation with intentionally augmented restraining current using an equivalent alpha plane according to one embodiment. The method 1400 includes calculating 1410 an overall differential current as a sum of the remote partial differential currents and the local partial differential current compensated current, as discussed above with respect to equations (8) and (9). As discussed above, at least one of the remote partial differential currents and the local partial differential current is compensated for charging current.

As discussed below, the method 1400 also includes calculating 1412 a restraining current corresponding to remote partial restraining currents and a local partial restraining current. The method 1400 also includes augmenting 1414 the overall restraining current. For example, the overall restraining current may be intentionally augmented based on one or more of the second, fourth, and/or fifth harmonic of the differential current. In addition, or in other embodiments, a value derived from an RMS value of the high frequency spectrum of the differential signal may be added to the restraining current.

As discussed in detail below, the method 1400 also includes converting 1416 the differential and restraining currents to a first equivalent current and a second equivalent current of a two-terminal equivalent power apparatus, and determining 1418 the complex current ratio of the first equivalent current and the second equivalent current.

Figure 15:
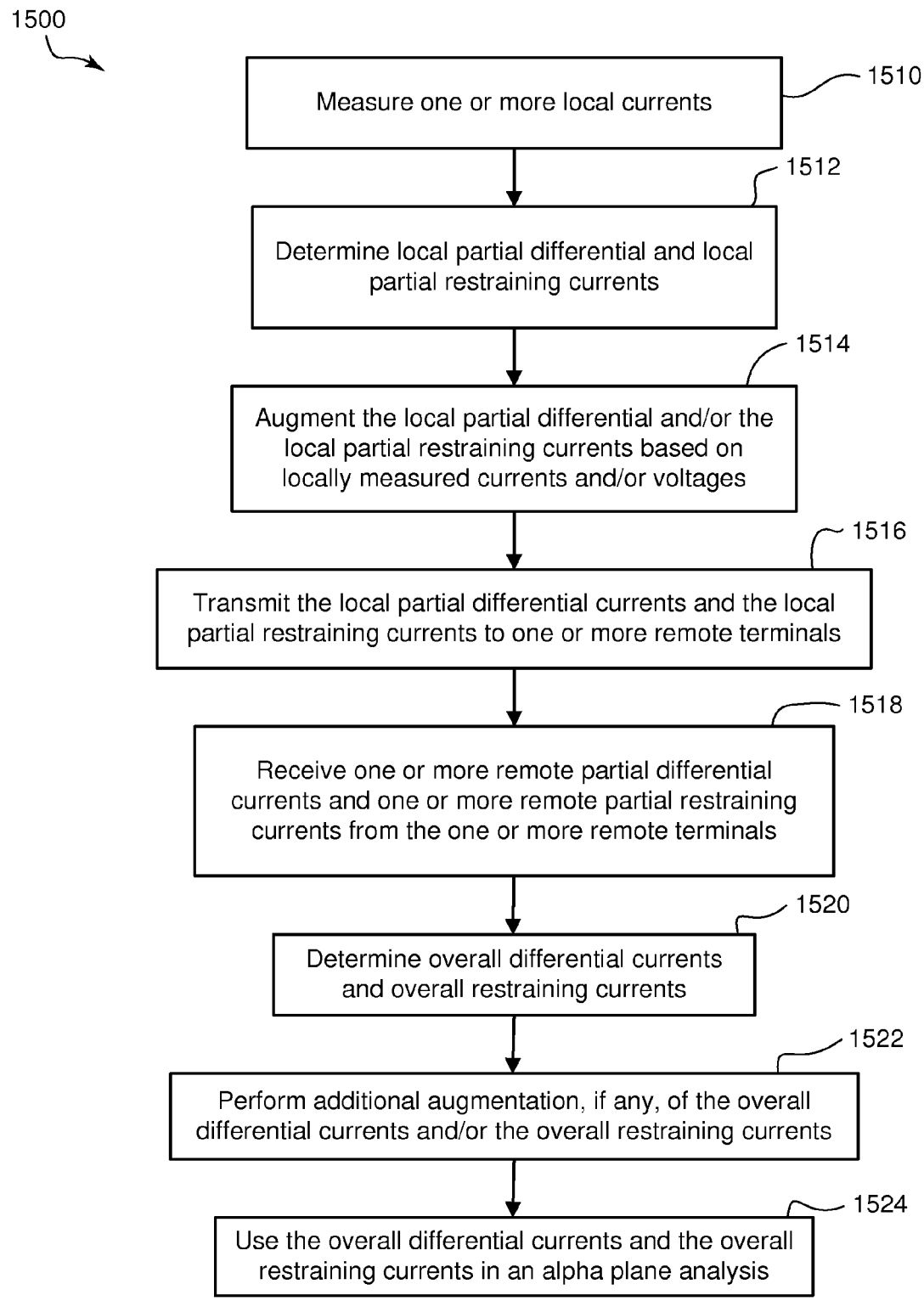
FIG. 15 is a flow chart of a method for line current differential protection that includes augmenting partial differential currents and/or partial restraining currents according to one embodiment.

FIG. 15 is a flow chart of a method 1500 for line current differential protection that includes augmenting partial differential currents and/or partial restraining currents according to one embodiment. The method 1500 includes measuring 1510 one or more local currents, and determining 1512 local partial differential currents and local partial restraining currents. The method 1500 further includes augmenting 1514 the local partial differential currents and/or the local partial restraining currents based on locally measured currents and/or voltages. For example, a local terminal may subtract a local portion of a charging current from the local partial differential current. In addition, or in another embodiment, the local terminal may augment the local restraining current based on harmonics of the local differential current.

The method 1500 further includes transmitting 1516 the local partial differential currents and the local partial restraining currents to one or more remote terminals, and receiving 1518 one or more remote partial differential currents and one or more remote partial restraining currents from the one or more remote terminals. Based on the exchanged information, the method 1500 further includes determining 1520 overall differential currents and overall restraining currents.

At this point, the method 1500 may also include performing 1522 additional augmentation, if any, of the overall differential currents and/or the overall restraining currents. As discussed in detail below, the method 1500 also includes using 1524 the overall differential currents and the overall restraining currents in an alpha plane analysis.

Overview of Alpha Plane for Two Terminals

As discussed above, winding currents are compensated based on their respective flows through transformer windings, and the compensated currents may be used to calculate a complex current ratio used in an alpha plane analysis to selectively determine when to trip a power apparatus that includes the transformer. The disclosure below discusses details of the alpha plane principle and a two-terminal equivalent protection zone for applying the alpha plane for a multi-terminal power apparatus. As disclosed herein, transformer differential protection using the equivalent alpha plane is provided for a power apparatus that includes a power transformer.

For a zone of protection, the alpha plane principle individually compares magnitudes and angles of currents within the zone. The alpha plane principle is naturally applied to two terminal lines in a zone of protection where the ratio of magnitudes is compared, as well as the relative angle between the two currents. In the determination of faults, a complex current ratio k is calculated and located in the alpha plane, which is a graphical representation of the vector ratio of the first current $I_1$ (e.g., remote current) to the second current $I_2$ (e.g., local current). Line current values from the first relay (e.g., remote relay) and the second relay (e.g., local relay) are combined into a ratio of current values. This ratio k has a magnitude and an angle and may be plotted on the complex current ratio plane with real and imaginary axes. It is understood that the directionality of both the currents is consistent with respect to the protected line—they are both measured into or out of the line.

Figure 16:
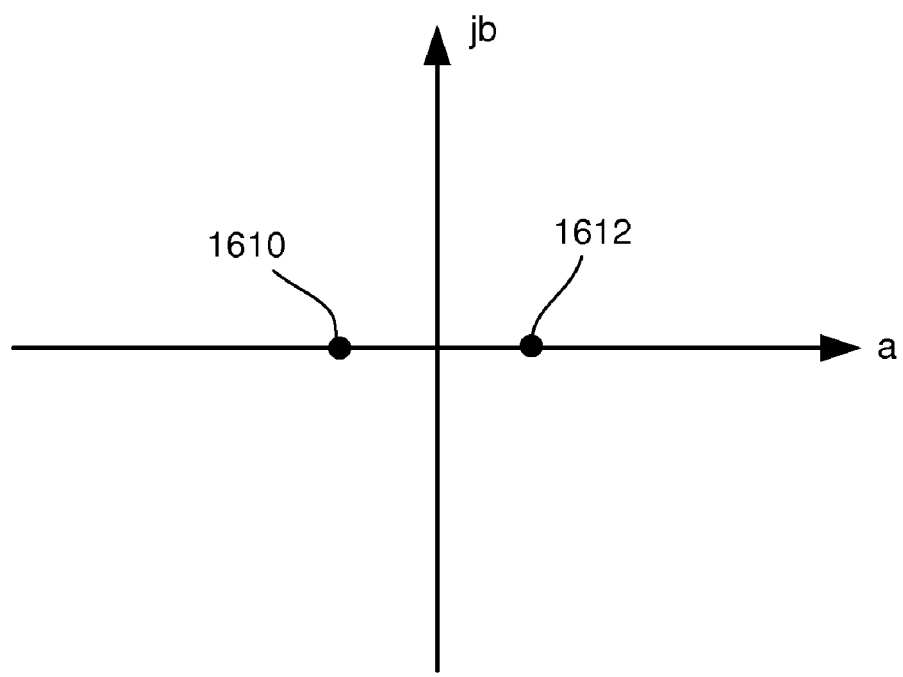
FIG. 16 is a simplified diagram of an alpha (current ratio) plane.

FIG. 16 is a simplified diagram of an alpha (current ratio) plane. The labels for the two axes of the plane, a and jb, are derived as follows:

$$k = \frac{\vec{I_1}}{\vec{I_2}} = re^{j\theta} = a + jb, \tag{15}$$

$$a = \text{Re}\left(\frac{\vec{I_1}}{\vec{I_2}}\right), \tag{16}$$

$$b = \text{Im}\left(\frac{\vec{I_1}}{\vec{I_2}}\right), \tag{17}$$

where Re and Im refer to the real and imaginary parts of the current ratio.

Ideally, through current appears in equal but opposite values at the two relays, so for load and external faults, $$k = \frac{I_1}{I_2} = 1\angle 180°, \tag{18}$$

which is represented by the point labeled 1610 in FIG. 16.

With respect to internal faults, the fault current is equal at both ends of the line only when the line is homogenous and the contributions to the fault from both ends of the line are equal, e.g., when the two sources have equal strength and the fault is at the mid-point of the line. In such a case, $$k = \frac{I_1}{I_2} = 1\angle 0°. \tag{19}$$

However, as the internal fault moves toward the second (local) relay, $I_2$ will increase and point 1612 in the alpha plane will move toward the origin when viewed from the second (local) relay. For large remote currents, when compared to the local current, the point will move away from the origin, as viewed from the local relay. As the fault moves away from the second (local) relay, $I_2$ will decrease and the point will move.

It should be understood that a separate alpha plane representation would exist for each of the three phase currents $I_A$, $I_B$, and $I_C$. Further, in certain embodiments, a separate alpha plane representation may be provided for zero sequence currents, negative sequence currents, positive sequence currents, or combinations of the foregoing. For example, an alpha plane representation may include a current that is a combination of a zero sequence current (e.g., 25%) and a negative sequence current (e.g., 75%).

Various system factors, including non-homogenous power systems, cause the angle of the fault current in the alpha plane at each terminal to be different, which results in the ratio point for an internal fault to move up or down in the alpha plane along an arc that moves through the "a" axis. Various other factors, including line measurement errors, line charging current, CT (current transformer) saturation effects, transient effects in the power system compensation capacitors, and other aspects of the relay system can cause the current ratio k for external faults to move away from point 1610 shown in FIG. 16. For internal faults, such factors will result in the current ratio moving around on the alpha plane.

The movement from point 1610 in the alpha plane for external faults (e.g., from the ideal external fault or load) complicates the line differential system's decision in (1) declaring a fault on the protected line and tripping the associated circuit breaker on the line or (2) restraining the fault declaring action because the current ratio is due to load or an external fault or to system factors and/or errors.

There is a region defined in the alpha plane that is a "restrain" (block) region and a region that is an "operate" (trip) region, to enable appropriate decision making with respect to the restrain and operate options. In the present disclosure, all of the points in the alpha plane that should not result in a trip action by the line differential element define a restrain region for which there is no trip signal, while the remaining portions in the alpha plane are in the operate region for which a trip signal is normally allowed.

Figure 17:
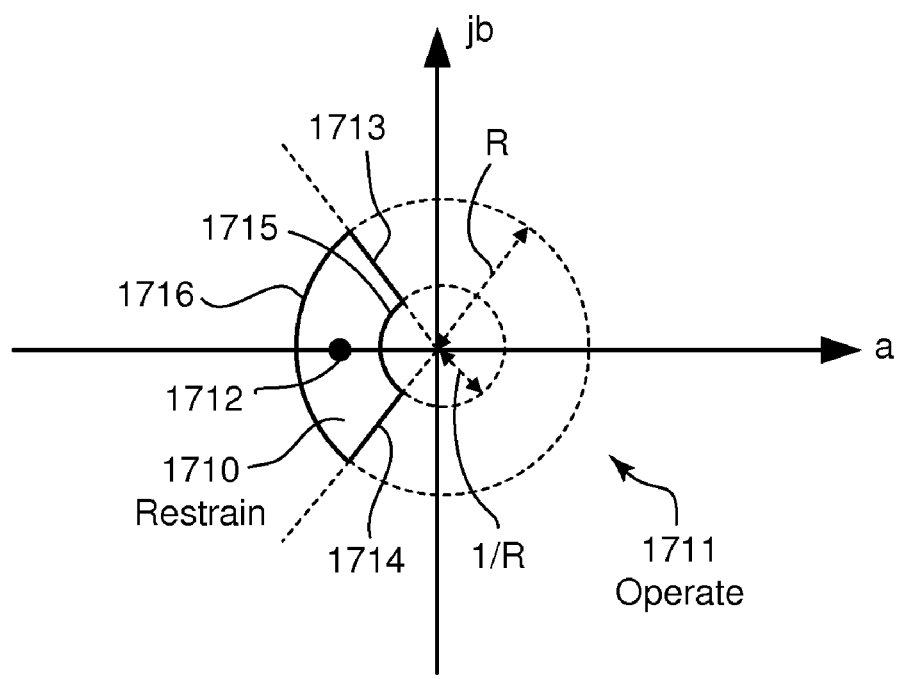
FIG. 17 graphically illustrates a restrain region and an operate region in an alpha plane used according to one embodiment for fault determination decisions.

FIG. 17 graphically illustrates a restrain region 1710 and an operate region 1711 in an alpha plane used according to one embodiment for fault determination decisions. For illustrative purposes, the restrain region 1710 is shown as enclosed within solid lines. Again, the operate region 1711 may include all points it the alpha plane that are not in the restrain region 1710. The restrain region 1710 in the alpha plane illustrated in FIG. 17 is placed around the ideal external fault point 1712. The restrain region 1710 is defined by a user-selected current ratio (blocking) angle (shown as the radial lines 1713 and 1714 above and below the "a" axis), the range of which accommodates current ratio values affected by various system factors, including line charging current values, CT saturation, and sample time and data alignment errors. The restrain region 1710 is further defined by a user-selected magnitude of the current ratio (shown as the curved lines 1715, 1716), the range of which accommodates CT saturation among other factors. Generally, a user selects a radius R for the outer curved line 1716, which results in the inner curve being set as 1/R. The alpha plane principle allows for shaping the restrain region 1710 with more user control as compared with the traditional percentage-restrained differential principle.

Logic circuitry (not shown) may use a series of logical comparisons and other functions to determine where the current ratio k is located in the alpha plane, and specifically whether the current ratio k is within the restrain region 1710, in which case there is no trip signal. When the current ratio k is outside of the restrain region 1710, into the operate region 1711, a trip signal is produced if the measured current values have satisfied certain threshold and other characteristics.

Multi-Terminal Alpha Plane Analysis

Being intuitive and straightforward in two-terminal applications, the alpha plane is less natural in a general N-terminal case. Complex current flow patterns can be encountered, such as a circulating current—a current leaving the zone at one terminal to re-enter it at the other. These patterns should be analyzed carefully in order to avoid a failure to trip by responding to one of the current flowing out of the zone to feed a load or circulating to the other line terminal. Many possible permutations of ratios between many possible currents would complicate understanding, implementation, testing and post event analysis of relays applying alpha plane to multiple terminals.

Thus, certain embodiments disclosed herein include a generalized N-terminal alpha plane concept. This protection method calculates a two-terminal equivalent for a general N-terminal case, and applies the alpha plane principle to two equivalent currents instead of to the multitude of the measured currents.

Figure 18:
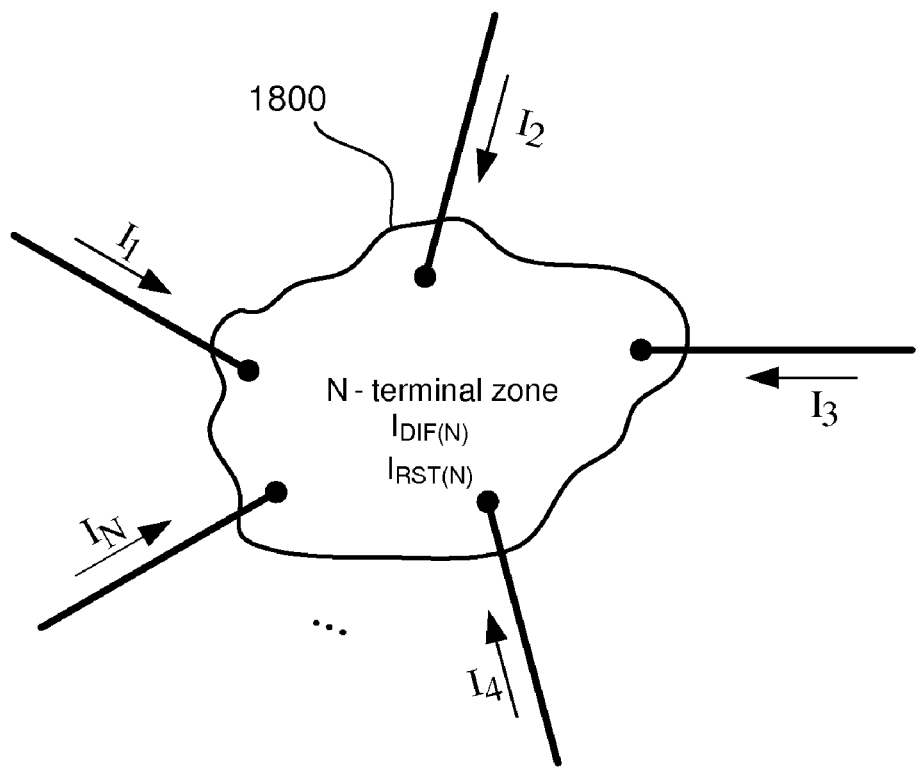
FIG. 18 schematically illustrates a general N-terminal differential zone of protection according to one embodiment.

FIG. 18 schematically illustrates a general N-terminal differential zone 1800 of protection according to one embodiment. In this example, the N-terminal zone 1800 includes currents $I_1, I_2, I_3, I_4, \ldots, I_N$ that each corresponds to a respective terminal. An artisan will recognize from the disclosure herein that any number of currents greater than one may be used for the N-terminal zone 1800. For example, if N=3 for a three terminal system, then only currents $I_1, I_2,$ and $I_3$ would correspond to the N-terminal zone 1800. The differential principle would derive the following differential current $I_{DIF(N)}$ and restraining current $I_{RST(N)}$ for the N-terminal zone 1800:

$$I_{DIF(N)} = \sum_{k=1}^{N} I_k, \quad (20)$$

$$I_{RST(N)} = \sum_{k=1}^{N} |I_k|. \quad (21)$$

In this example embodiment, the restraining current $I_{RST(N)}$ is a summation of current amplitudes. An artisan will recognize, however, that the restraining current $I_{RST(N)}$ may be determined in a variety of different ways. As discussed above, the restraining current $I_{RST(N)}$ is used to provide a notion of the current flowing through the zone 1800. Thus, depending on the particular application, the restraining current $I_{RST(N)}$ may be defined as the maximum measured current (e.g., where the highest current corresponds to an external fault current), a summation of current amplitudes (as used in equation (21) and the example solution provided herein), a summation of currents that is divided by the total number of currents (e.g., the average current), or a product of currents.

Figure 19:
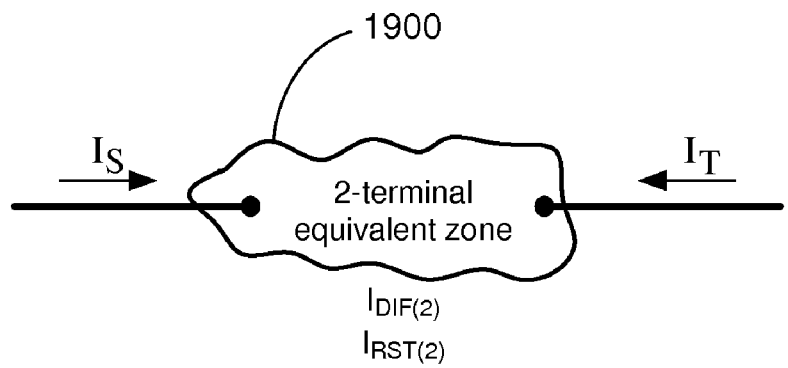
FIG. 19 schematically illustrates a two-terminal equivalent zone of protection according to one embodiment.

FIG. 19 schematically illustrates a two-terminal equivalent zone 1900 of protection according to one embodiment. As discussed above, a two-terminal zone is the natural application for the alpha plane. The two-terminal equivalent zone 1900 shown in FIG. 19 includes two virtual currents $I_S, I_T$ that provide an equivalent representation of the currents $I_1, I_2, I_3, I_4, \ldots, I_N$ of the N-terminal zone 1800 shown in FIG. 18. The differential principle may be applied to the two virtual currents $I_S, I_T$ to derive a differential current $I_{DIF(2)}$ and a restraining current $I_{RST(2)}$ for the two-terminal equivalent zone 1900.

The two virtual currents $I_S$, $I_T$ in the two-terminal equivalent zone 1900 are sought such that the same differential current and the same restraining currents are determined in the two-terminal equivalent zone 1900 as in the actual N-terminal zone 1800:

$$I_{DIF(2)} = I_{DIF(N)}, \qquad (22)$$

$$I_{RST(2)} = I_{RST(N)}. \qquad (23)$$

The two currents $I_S$, $I_T$ of the two-terminal equivalent have a total of four degrees of freedom (two magnitudes and two angles), while there are a total of three boundary equations: the real and imaginary parts of the differential current (equation (22)), and the magnitude of the restraining current (equation (23)). Thus, there are three equations and four unknowns.

To solve for the four unknowns according to certain embodiments, a fourth balance equation is provided (or the number of unknowns is reduced to three) by assigning an attribute from one of the N measured zone currents $I_1, I_2, I_3, I_4, \ldots, I_N$ to either one of the two equivalent currents $I_S, I_T$. For example, the zone current $I_1, I_2, I_3, I_4, \ldots, I_N$ with the greatest amplitude may be selected for the magnitude of one of the virtual currents $I_S$, $I_T$.

In another embodiment, the fourth balance equation calls for one of the two equivalent currents $I_S$, $I_T$ to be in phase with a specific zone current $I_P$ selected from among the N zone currents $I_1, I_2, I_3, I_4, \ldots, I_N$.

In one example embodiment, the specific zone current $I_P$ is selected as the zone current $I_1, I_2, I_3, I_4, \ldots, I_N$ that is the highest after projection on the line of the differential current $I_{DIF(N)}$. A rationale behind this choice is that during external faults with CT saturation the spurious differential signal, if significant, will be approximately located along the line of the fault current. Therefore, by selecting the reference current $I_P$ that is closest in phase to the differential current, the conversion positions the two equivalent alpha plane currents $I_S$, $I_T$ along the lines of the current flowing into and out of the zone 1800.

To select the reference current $I_P$ according to one embodiment, the following auxiliary numbers $R_k$ are calculated first:

$$R_k = |\mathrm{real}(I_k I_{DN}^*)|, k=1 \ldots N, \qquad (24)$$

wherein $I^*_{DN}$ represents the complex conjugate of the differential current $I_{DIF(N)}$ of the N-terminal zone 1800.

The current with the highest value of R becomes the reference current $I_P$. Denoting the angle of this current as $\beta$:

$$\beta = \mathrm{angle}(I_P). \qquad (25)$$

The differential current $I_{DIF(N)}$ is shifted for the convenience of subsequent calculations as follows:

$$I_X = I_{DIF(N)} \cdot 1 \angle (-\beta). \qquad (26)$$

The two currents $I_S$, $I_T$ of the two-terminal equivalent zone 1900 are now calculated as follows:

$$I_T = \left( \frac{\mathrm{Im}(I_X)^2 - (I_{RST(N)} - \mathrm{Re}(I_X))^2}{2 \cdot (I_{RST(N)} - \mathrm{Re}(I_X))} + j \cdot \mathrm{Im}(I_X) \right) \cdot 1 \angle \beta, \qquad (27)$$

$$I_S = (I_{RST(N)} - |I_T|) \cdot 1 \angle \beta. \qquad (28)$$

The two-terminal alpha plane protection principle takes over from here, working with the $I_S$ and $I_T$ currents. Thus, $I_S$ and $I_T$ may be used to calculate the complex current ratio k as:

$$\frac{I_S}{I_T} = k = k_{mag} \angle \alpha. \qquad (29)$$

One application of the process discussed above is to convert a multi-terminal power apparatus that includes three or more terminals into an equivalent two-terminal power apparatus for use with the alpha plane. An artisan will recognize from the disclosure herein that the method may also be used for a two-terminal power apparatus. In other words, the same process may be used for a two-terminal power apparatus and a power apparatus that has three or more terminals. When the above equations are applied to a two-terminal power apparatus having a first measured current $I_1$ and a second measured current $I_2$, for example, the result is that the equivalent currents $I_S$, $I_T$ respectively equal the measured currents $I_1$, $I_2$.

The differential principle has been used in the method discussed above as a mathematical mapping tool to project the general case of the N-terminal differential zone 1800 into the equivalent two-terminal zone 1900, requiring the differential current $I_{DIF(N)}$ and the restraining current $I_{RST(N)}$ to be identical between the N-terminal application and its two-terminal equivalent. The method may be applied to phase, negative sequence, and/or ground differential elements with filtered differential and restraint currents from partial terms communicated between the various relays of the N-terminal system.

Figure 20A:
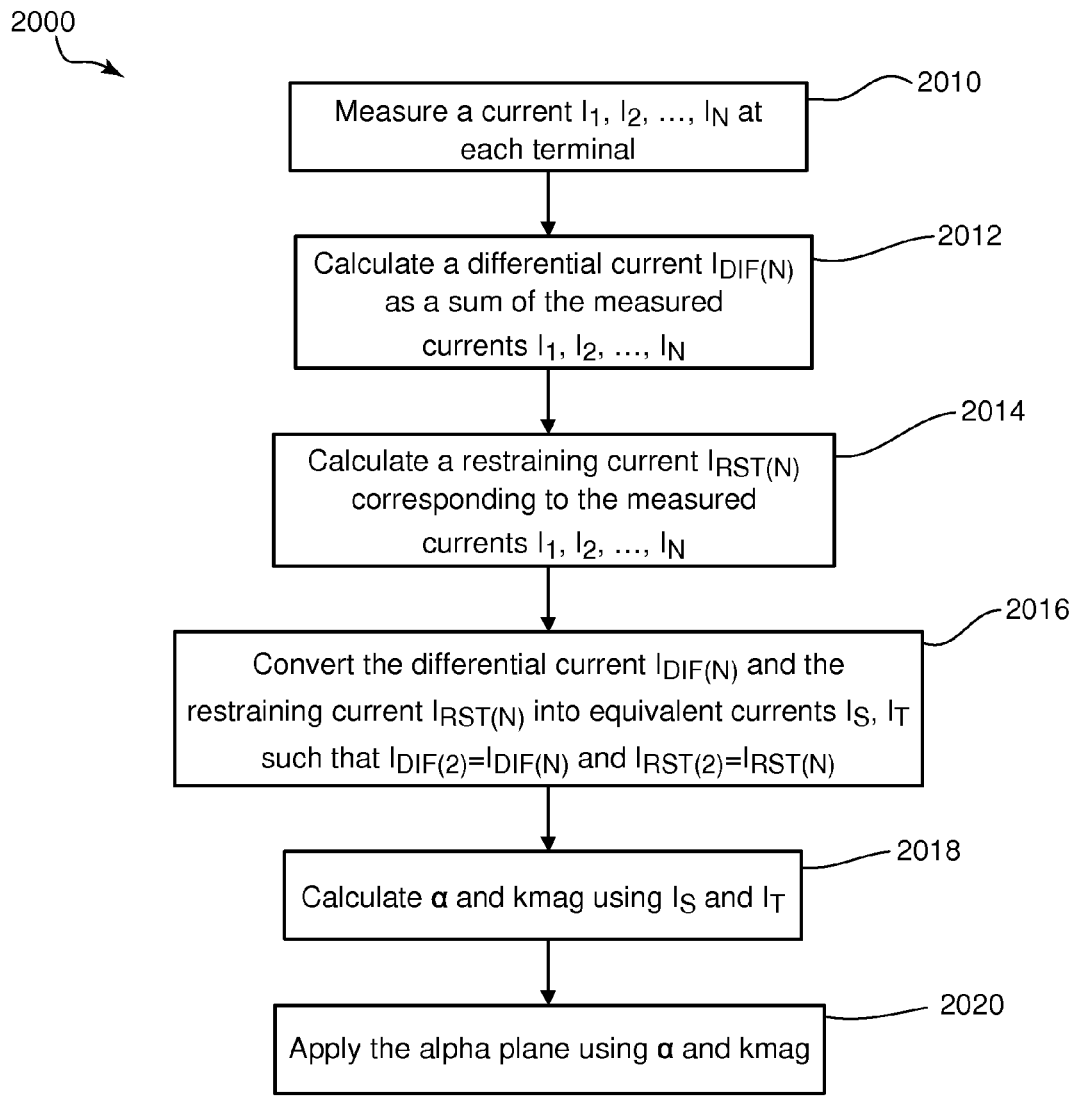
FIG. 20A is a flow diagram of a method for current differential protection of a multi-terminal power apparatus according to one embodiment.

FIG. 20A is a flow diagram of a method 2000 for current differential protection of a multi-terminal power apparatus according to one embodiment. The method 2000 includes measuring 2010 a current $I_1, I_2, \ldots, I_N$ at each terminal, respectively. The method 2000 also includes calculating 2012 a differential current $I_{DIF(N)}$ as a sum of the measured currents $I_1, I_2, \ldots, I_N$, and calculating 2014 a restraining current $I_{RST(N)}$ corresponding to the currents $I_1, I_2, \ldots, I_N$. As discussed above, in one embodiment, the restraining current $I_{RST(N)}$ is calculated as a sum of the absolute values (amplitudes) of the measured currents $I_1, I_2, \ldots, I_N$. Then, the method 2000 includes converting 2016 the differential current $I_{DIF(N)}$ and the restraining current $I_{RST(N)}$ into equivalent currents $I_S$, $I_T$ such that $I_{DIF(2)} = I_{DIF(N)}$ and $I_{RST(2)} = I_{DIF(N)}$. As discussed in detail below, in some embodiments the differential current $I_{DIF(N)}$ and/or the restraining current $I_{RST(N)}$ may be intentionally augmented before being converted 2016 to the equivalent currents $I_S$, $I_T$. The augmentation may be based on a physical condition of the multi-terminal power apparatus. The method 2000 further includes calculating 2018 a and $k_{mag}$ using the equivalent currents $I_S$, $I_T$ (see equation (29) above), and applying 2020 the alpha plane using a and $k_{mag}$.

Figure 20B:
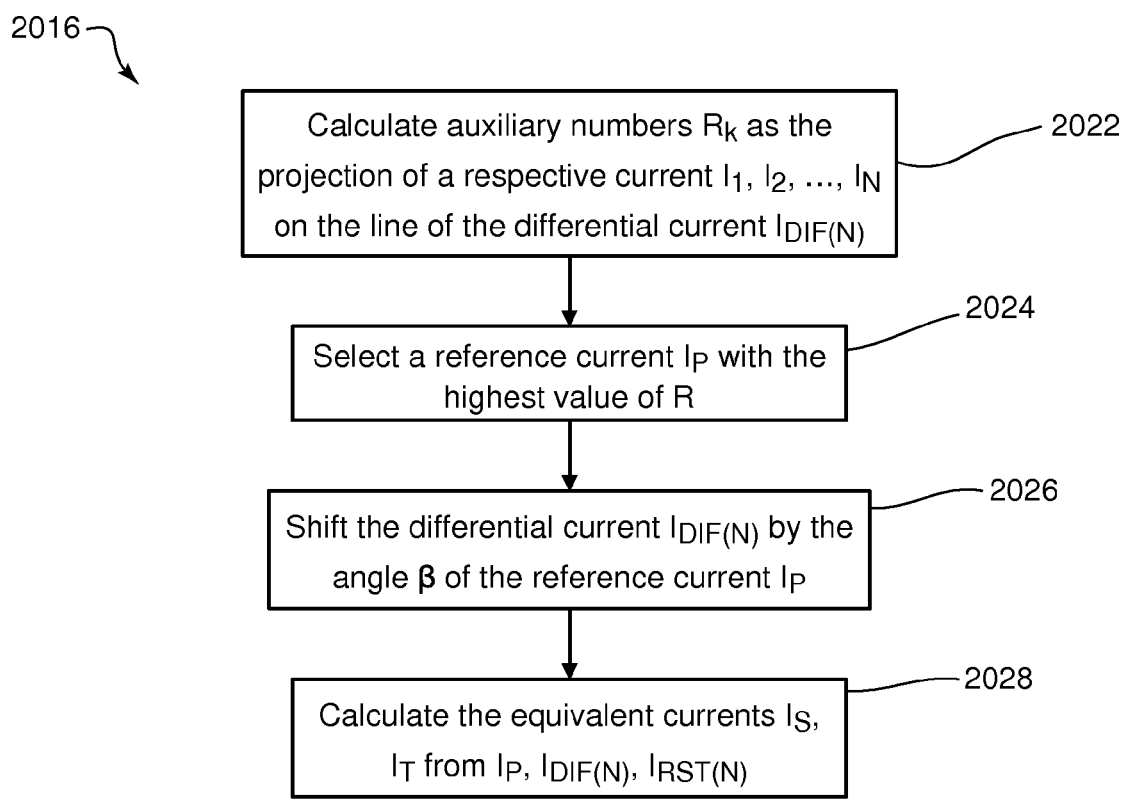
FIG. 20B is a flow diagram of a method for converting a differential current and a restraining current into the equivalent currents according to one embodiment.

FIG. 20B is a flow diagram of a method 2016 for converting the differential current $I_{DIF(N)}$ and the restraining current $I_{RST(N)}$ into the equivalent currents $I_S$, $I_T$ according to one embodiment. The method 2016 includes calculating 2022 auxiliary numbers $R_k$ as the projection of a respective current $I_1, I_2, \ldots, I_N$ on the line of the differential current $I_{DIF(N)}$, selecting 2024 a reference current $I_P$ as the current corresponding to the highest value of R, shifting 2026 the differential current $I_{DIF(N)}$ by the angle $\beta$ of the reference current $I_P$, and calculating 2028 the equivalent currents $I_S$, $I_T$ from $I_P$, $I_{DIF(N)}$, and $I_{RST(N)}$.

The generalized alpha plane allows implementation of the two-terminal principle to multi-terminal lines, retaining advantages while enabling new applications. Note the following:

(1) As discussed above, the generalized principle is transparent in two-terminal applications. In other words, the two equivalent currents equal the two actual currents.

(2) Any case with a balanced differential current and non-zero restraining current yields an ideal blocking point on the alpha plane ($1 \angle 180°$. Decreasing the differential current, such as by line charging current compensation, brings the alpha plane point closer to the ideal blocking position.

(3) Any case with higher restraining current under a given differential current brings the alpha plane point closer to the ideal blocking point. The method allows applications where the restraint term is artificially increased such as when using harmonic restraint in transformer protection.

(4) The principle works well without the need to communicate all local currents individually from all terminals. The partial differential and restraint terms map well into the generalized alpha plane.

(5) The principle works well during external fault under CT saturation. First, by relying on the true restraint term, the calculated alpha plane point shows a strong blocking tendency. Second, extra security is added by the nature of the alpha plane itself.

(6) The principle works very well for elements that implement ground (e.g., 87LG) and negative-sequence (e.g., 87LQ) differential functions. Under internal faults, the elements' currents are close in phase, and differ only by the system non-homogeneity angles. The generalized alpha plane returns a strong unblocking indication in this case regardless of the magnitudes of the compared currents. Under external faults, including faults that do not produce any natural restraint (phase to phase faults for the 87LG, for example), a cross phase restraint may be used upon detecting an external fault by other elements of the logic circuit, such as an external fault detector (EFD). With increased restraint, the equivalent alpha plane point shifts safely toward blocking.

(7) By reducing a differential zone of protection with any number of terminals to a single operating point on the alpha plane, the principle simplifies implementation, testing, and post event analysis.

An artisan will recognize other advantages from the embodiments disclosed herein.

Examples of Multi-Terminal Alpha Plane

The following numerical embodiments of multi-terminal alpha plane analysis are provided by way of example only, and not by limitation. An artisan will recognize from the disclosure herein that any current values may be used and/or that any number of terminals may be used, including two terminals. Further, the numbers used in these examples may be approximations.

Figure 21A:
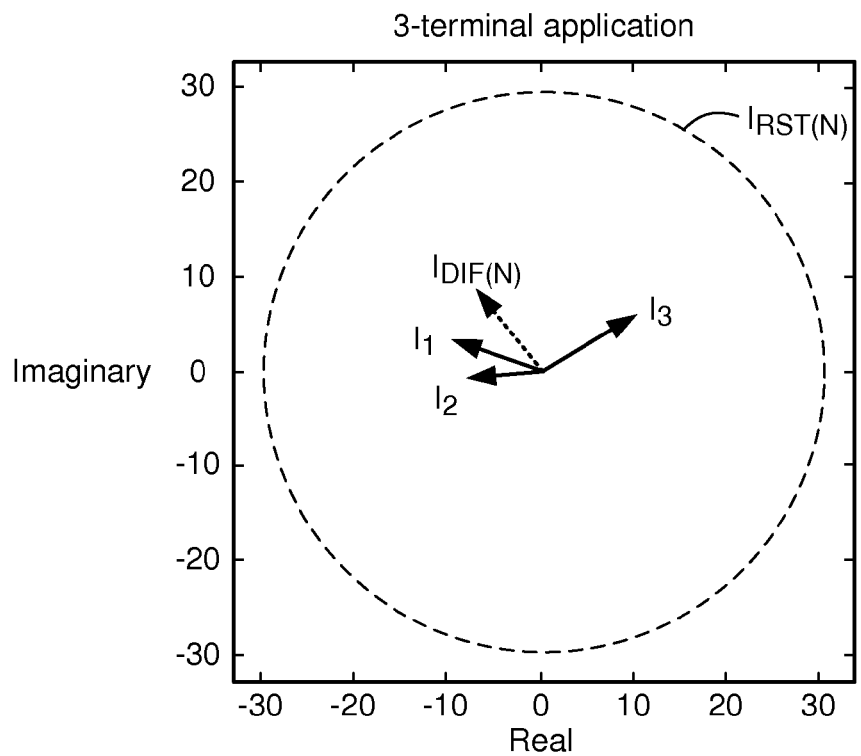
FIG. 21A graphically illustrates an alpha plane for a three-terminal application (N=3) according to one example embodiment.

FIG. 21A graphically illustrates an alpha plane for a three-terminal application (N=3) according to one example embodiment. In this example, the three currents $I_1$, $I_2$, $I_3$ measured at the three respective terminals are:

$I_1 = 10.0 A \angle 160°$,
$I_2 = 8.0 A \angle 175°$,
$I_3 = 12.0 A \angle 30°$.

The three measured currents $I_1$, $I_2$, $I_3$ are plotted on the alpha plane shown in FIG. 21A. Using equation (20), the differential current $I_{DIF(N)} = 11.2 A \angle 128°$. Using equation (21), the restraining current $I_{RST(N)} = 30.0$. The measured currents $I_1$, $I_2$, $I_3$ are shown as solid lines in FIG. 21A. While the differential current $I_{DIF(N)}$ and the restraining current $I_{RST(N)}$ are not generally shown on the alpha plane, for illustrative purposes, the differential current $I_{DIF(N)}$ is shown as a dashed line and the restraining current $I_{RST(N)}$ is shown as a dashed circle in FIG. 21A.

Following the methods discussed above and illustrated in FIGS. 20A and 20B, equation (24) provides the auxiliary numbers $R_k$ as:

$R_1 = 97.37 A^2$,
$R_2 = 49.50 A^2$,
$R_3 = 20.14 A^2$.

Because $R_1$ is the largest of the three auxiliary numbers, the corresponding first current $I_1$ is selected as the reference current $I_F = 10.0 A \angle 160°$. This means that one of the equivalent currents will be located on the line of 160° or −20°.

Solving equations (26), (27), and (28) for the two-current equivalent provides:

$I_T = 11.1 A \angle 11.7°$ and
$I_S = 18.9 A \angle 160°$.

Figure 21B:
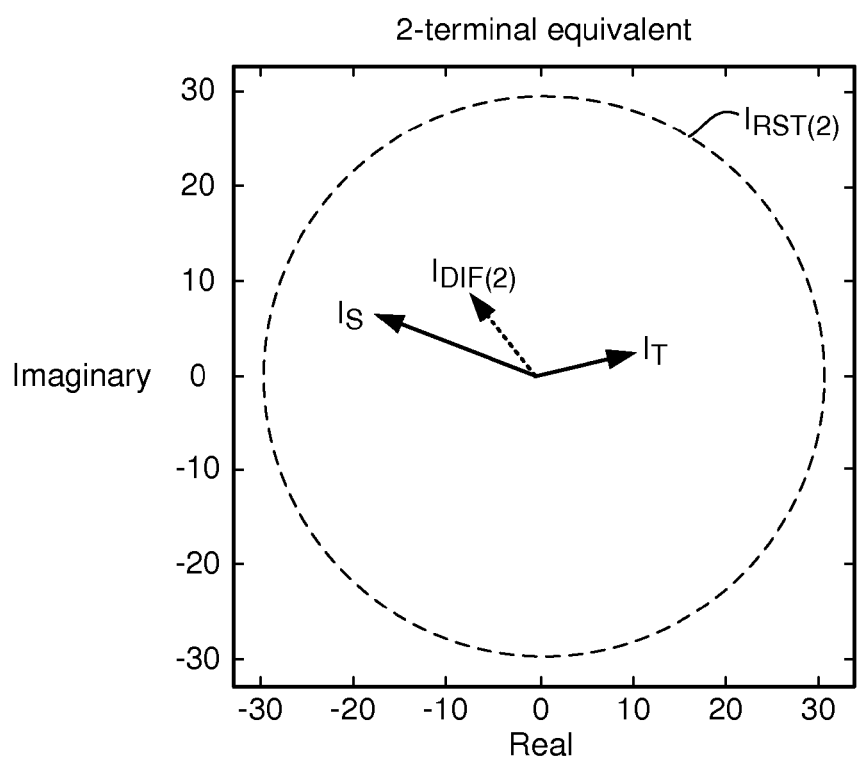
FIG. 21B graphically illustrates an alpha plane for the two-terminal equivalent of the embodiment shown in FIG. 6A according to one embodiment.

FIG. 21B graphically illustrates an alpha plane for the two-terminal equivalent of the embodiment shown in FIG. 21A according to one embodiment. Using equation (20), the equivalent differential current $I_{DIF(2)} = 11.2 A \angle 128°$. Using equation (21), the equivalent restraining current $I_{RST(2)} = 30.0$. The equivalent currents $I_S$, $I_T$ are shown as solid lines in FIG. 21B. For illustrative purposes, the equivalent differential current $I_{DIF(2)}$ is shown as a dashed line and the equivalent restraining current $I_{RST(2)}$ is shown as a dashed circle in FIG. 21B. Note that when calculated for this two-terminal equivalent, the equivalent differential current $I_{DIFF(2)}$ and the equivalent restraining current is $I_{RST(2)}$ are the same as those calculated in the original three-terminal system.

Using equation (29), the two equivalent currents $I_S$, $I_T$ give the operating point on the alpha plane of $k = 1.71 \angle 148.3°$, which is not shown in FIGS. 21A and 21B. Because this example does not include the limits of a restrain region, it is not determined whether this operating point k would result in assertion of a tripping signal. If the operating point k is outside the restrain region, however, the alpha plane in FIG. 21A indicates that this is likely the result of an external fault because the third current $I_3$ is near 180° from the sum of the first and second currents $I_1$, $I_2$. Similarly, FIG. 21B indicates that a fault condition would be an external fault because the phase difference between the equivalent currents $I_S$, $I_T$ is close to 180° and the ratio of magnitudes is not far from 1.

Figure 22A:
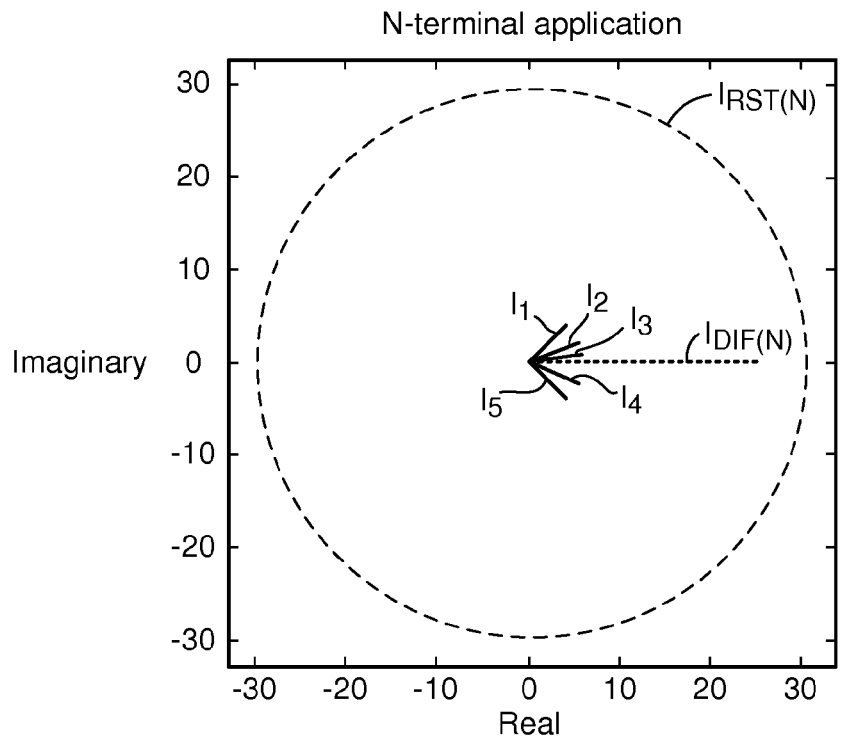
FIGS. 22A and 22B graphically illustrate respective alpha planes for the case of an internal fault according to one embodiment.
Figure 22B:
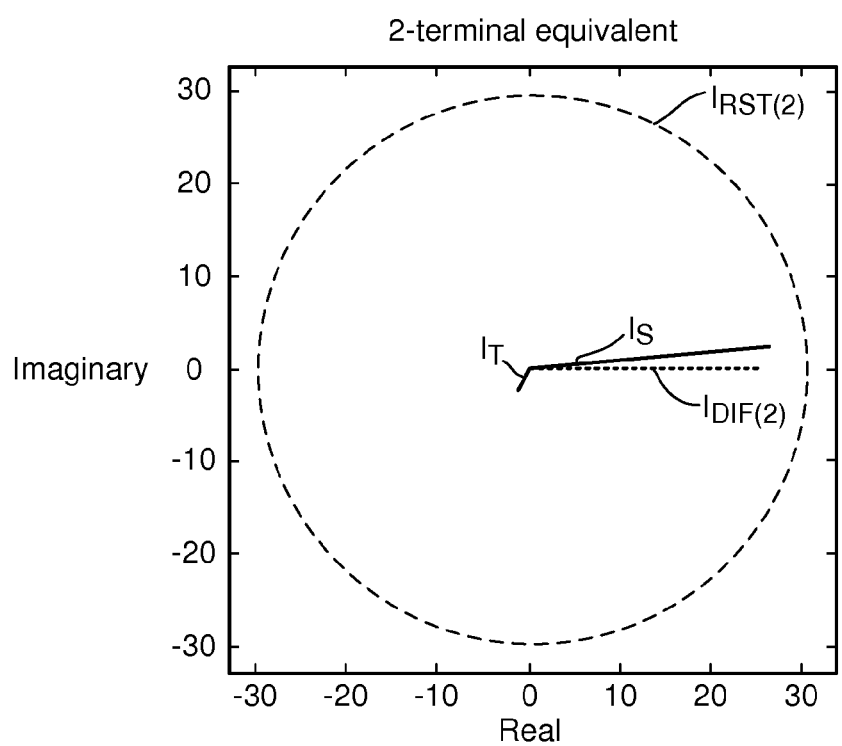

By way of contrast with the example shown in FIGS. 21A and 21B, FIGS. 22A and 22B graphically illustrate respective alpha planes for the case of an internal fault according to one embodiment. FIG. 22A illustrates the alpha plane for a five-terminal power apparatus where the five measured currents $I_1$, $I_2$, $I_3$, $I_4$, $I_5$ are approximately equal in magnitude but flow in the same general direction with some limited angle dispersion, which indicates an internal fault. FIG. 22B illustrates the alpha plane for the two-terminal equivalent of the embodiment shown in FIG. 22A. A large difference between the magnitudes of the equivalent currents $I_S$, $I_T$ (as shown in FIG. 22B) indicates the internal fault, which results in asserting a trip signal.

The examples shown in FIGS. 21A, 21B, 22A, and 22B are static in that they represent currents measured at a particular point in time. The next example is dynamic in that it illustrates changes in current over time. In this example, dual-breaker terminals are used. Modern line protection relays may support two three-phase sets of current inputs and measure the two currents independently facilitating applications to lines terminated via two circuit breakers. Such an integrated protection package works with the internally summed current for the main protection function—distance, ground directional overcurrent in a pilot-assisted scheme, or the line current differential. At the same time it provides for two independent breaker failure functions, two independent auto-reclosers, metering, recording and time coordinated backup all responding to the individual breaker currents.

Figure 23:
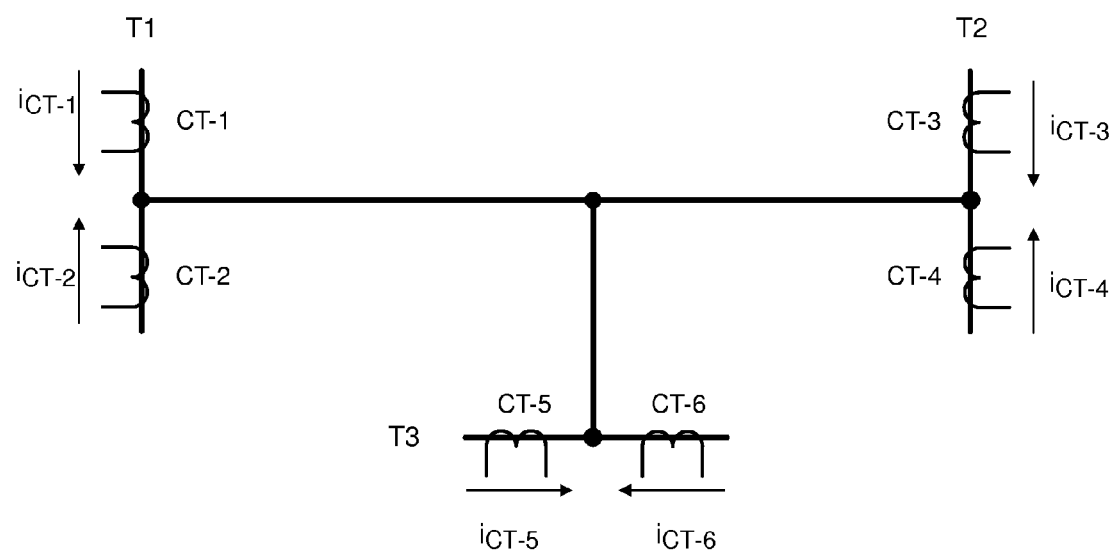
FIG. 23 schematically illustrates a three-terminal dual-breaker line configuration according to one embodiment.
Figure 24:
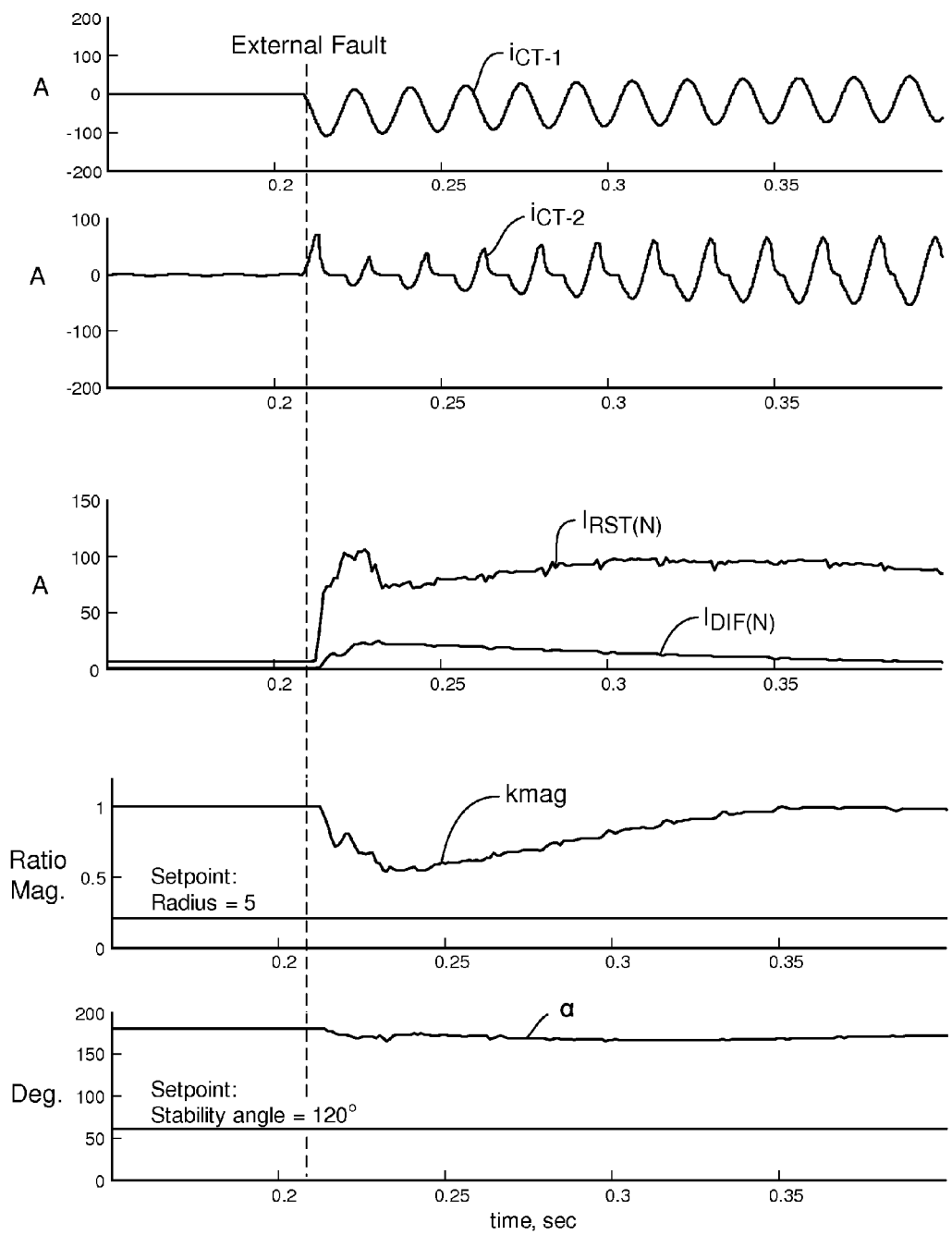
FIG. 24 illustrates plots of various signals during an external AB fault in the configuration shown in FIG. 8 according to one embodiment.

FIG. 23 schematically illustrates a three-terminal dual-breaker line configuration according to one embodiment. A first terminal T1 includes two breakers with associated current transformers CT-1, CT-2 measuring currents $i_{CT-1}$, $i_{CT-2}$. A second terminal includes two breakers with associated current transformers CT-3, CT-4 measuring currents $i_{CT-3}$, $i_{CT-4}$. A third terminal includes two breakers with associated current transformers CT-5, CT-6 measuring currents $i_{CT-5}$, $i_{CT-6}$. FIG. 24 illustrates plots of various signals during an external AB fault in the configuration shown in FIG. 23 according to one embodiment. Each signal is plotted with respect to time. The top plot shows the internal current $i_{CT-1}$ of the first terminal T1. The next plot shows the internal current $i_{CT-2}$ of the first terminal T1. The next plot shows the differential current $I_{DIF(N)}$ and the restraint current $I_{RST(N)}$. The bottom two plots show the magnitude $k_{mag}$ and the angle a, respectively, of the equivalent alpha plane. As shown, shortly after the beginning of the external fault the equivalent alpha plane yields an operating point of about 0.5∠170°, which is (correctly) within a typical blocking region of the alpha plane. Note that in this case the reference current $I_P$ is selected with some approximation as the line current differential system may not work directly with the individual currents at the faulted terminal but with partial differential and restrain terms explained below and related to the sums $i_{CT-1}+i_{CT-2}$, $i_{CT-3}+i_{CT-4}$, and $i_{CT-5}+i_{CT-6}$. Still, the large restraint term compared with the spurious differential keeps the equivalent alpha plane in the blocking region.

It will be understood by those having skill in the art that many changes may be made to the details of the above-described embodiments without departing from the underlying principles of the invention. The scope of the present invention should, therefore, be determined only by the following claims.

The invention claimed is:

1. A method for current differential protection using charging current compensation for a power apparatus, wherein individual terminals dynamically determine their respective contributions, if any, to the charging current compensation as availability of one or more voltage sources dynamically changes within the power apparatus, the method comprising:
   calculating, at respective terminals of the power apparatus, local contributions to a charging current compensation value, each local contribution based on a local voltage measurement, a line capacitance value, and a multiplier corresponding to a total number of terminals contributing to the charging current compensation value;
   determining a change in the number of terminals contributing to the charging current compensation value as availability of one or more voltage sources dynamically changes within the power apparatus;
   in response to the change in the number of terminals contributing to the charging current compensation value, automatically adjusting the multiplier so that a sum of the local contributions represents a total charging current; and
   selectively tripping the power apparatus based on line current differential protection and the charging current compensation value.

2. The method of claim 1, further comprising:
   measuring a partial differential current at each terminal;
   subtracting the local contributions from the respective partial differential currents; and
   transmitting the partial differential currents with respective flags indicating whether each corresponding transmitted partial differential current is currently contributing to the charging current compensation value.

3. The method of claim 2, wherein the multiplier comprises an inverse of a sum of the flags which indicate that their respective terminal is currently contributing to the charging current compensation value.

4. The method of claim 2, wherein determining the change in the number of terminals contributing to the charging current compensation value comprises:
   determining that a local voltage source at a local terminal is currently unavailable;
   in response to the determination, setting a local multiplier at the local terminal to zero such that the corresponding local contribution to the charging current compensation value is zero, and setting a local flag to indicate that the local terminal is not currently contributing to the charging current compensation value; and
   transmitting a local partial differential current value and the local flag from the local terminal to the other terminals.

5. The method of claim 4, wherein the local contribution to the charging current compensation value at the local terminal, represented as $i_{C1}$, is converted from a local voltage value $v_1$ as:

$$i_{C1} = 1/T * C_{TOTAL} * d/dt(v_1),$$

wherein T is the number of terminals currently contributing to the charging current compensation, $C_{TOTAL}$ is the estimated total line capacitance, and $d/dt(v_1)$ is the derivative of the local voltage value $v_1$ with respect to time t.

6. The method of claim 2, further comprising:
   calculating an overall differential current as a sum of the transmitted partial differential current values;
   calculating an overall restraining current corresponding to a magnitude of the measured partial differential current values;
   determining high frequency components of a total differential current; and
   boosting the overall restraining current based on a magnitude of the high frequency components.

7. The method of claim 6, wherein selectively tripping the power apparatus comprises:
   converting the overall differential current and the overall restraining current into a first equivalent current of an equivalent two-terminal power apparatus and a second equivalent current of the equivalent two-terminal power apparatus,
      wherein a sum of the first equivalent current and the second equivalent current substantially equals the overall differential current of the original power apparatus, and
      wherein the values of the first equivalent current and the second equivalent current substantially yield the overall restraining current of the power apparatus; and
   based on the first equivalent current and the second equivalent current, selectively tripping the multi-terminal power apparatus.

8. The method of claim 7, wherein selectively tripping based on the first equivalent current and the second equivalent current comprises:
   applying an alpha plane analysis to the first equivalent current and the second equivalent current to determine whether to provide or block a trip signal.

9. A system for current differential protection using charging current compensation for a power apparatus, the system comprising:
   a local relay to determine local current values and a voltage value at a local terminal of a power apparatus; and
   one or more remote relays to determine remote current values and voltage values at respective remote terminals of the power apparatus,
   the local relay configured to:
      calculate a local contribution to a charging current compensation value based on the local voltage value, a line capacitance value, and a multiplier corresponding to a total number of relays contributing to the charging current compensation value;

determine a change in the number of terminals contributing to the charging current compensation value as availability of one or more voltage sources dynamically changes within the power apparatus;

in response to the change in the number of terminals contributing to the charging current compensation value, automatically adjust the multiplier so that a sum of the local contribution and any remote contributions represents a total charging current; and selectively trip the power apparatus based on line current differential protection and the charging current compensation value.

10. The system of claim 9, wherein the local relay is further configured to:

measure a local partial differential current;

subtract the local contribution from the local partial differential current;

transmit the local partial differential current with a local flag indicating whether the transmitted local partial differential current is currently contributing to the charging current compensation value; and receive, from the one or more remote relays, one or more remote partial differential currents with corresponding remote flags indicating whether each of the remote partial differential currents is currently contributing to the charging current compensation value.

11. The system of claim 10, wherein the multiplier comprises an inverse of a sum of the local and remote flags which indicate that their respective terminal is currently contributing to the charging current compensation value.

12. The system of claim 10, wherein the local relay is configured to determine the change in the number of terminals contributing to the charging current compensation value by:

determining that the local voltage source is currently unavailable;

in response to the determination, setting a local multiplier at the local relay to zero such that the corresponding local contribution to the charging current compensation value is zero, and setting the local flag to indicate that the local relay is not currently contributing to the charging current compensation value; and transmitting the local partial differential current value and the local flag from the local relay to the one or more remote relays.

13. The system of claim 12, wherein the local contribution to the charging current compensation value at the local relay, represented as $i_{C1}$, is converted from a local voltage value $v_1$ as:

$$i_{C1} = 1/T * C_{TOTAL} * d/dt(v_1),$$

wherein T is the number of relays currently contributing to the charging current compensation, $C_{TOTAL}$ is the estimated total line capacitance, and $d/dt(v_1)$ is the derivative of the local voltage value $v_1$ with respect to time t.

14. The system of claim 10, wherein the local relay is further configured to:

calculate an overall differential current as a sum of the local and remote partial differential currents;

calculate an overall restraining current corresponding to a magnitude of the local and remote partial differential current values;

determine high frequency components of the overall differential current; and boost the overall restraining current based on a magnitude of the high frequency components.

15. The system of claim 14, wherein the local relay is configured to selectively trip the power apparatus by:

converting the overall differential current and the overall restraining current into a first equivalent current of an equivalent two-terminal power apparatus and a second equivalent current of the equivalent two-terminal power apparatus, wherein a sum of the first equivalent current and the second equivalent current substantially equals the overall differential current of the original power apparatus, and wherein the values of the first equivalent current and the second equivalent current substantially yield the overall restraining current of the power apparatus; and based on the first equivalent current and the second equivalent current, selectively tripping the power apparatus.

16. The system of claim 15, wherein the local relay is further configured to applying an alpha plane analysis to the first equivalent current and the second equivalent current to determine whether to provide or block a trip signal.

17. A method for current differential protection using charging current compensation, the method comprising:

measuring local currents at respective terminals of a power apparatus;

calculating a total charging current of the power apparatus using an average line voltage derived from the measurements at respective terminals;

calculating a compensated differential current for the power apparatus by subtracting the calculated total charging current from a sum of the measured local currents;

calculating a complex current ratio corresponding to the compensated differential current;

applying an alpha plane analysis to the complex current ratio; and selectively tripping, based on the alpha plane analysis, the power apparatus.

18. The method of claim 17, wherein calculating the total charging current comprises:

measuring one or more local voltages at the respective terminals;

determining local multipliers based on a total number of terminals currently contributing to the charging current;

setting local multipliers associated with terminals not currently contributing to the charging current to zero; and calculating each local contribution as a product of the respective local multiplier, an estimated line capacitance, and a derivative of the respective local voltage with respect to time.

19. The method of claim 18, further comprising:

transmitting augmented currents among each of the terminals along with respective flags indicating whether the transmitted augmented currents are currently contributing to the charging current.

20. The method of claim 19, further comprising:

determining a change in the number of terminals currently contributing to the charging current as availability of one or more voltage sources dynamically changes within the power apparatus;

in response to the change in the number of terminals contributing to the charging current, automatically adjusting the local multipliers so that a sum of the local contributions represents a total charging current.

21. The method of claim 19, wherein calculating the complex current ratio comprises:

calculating an overall differential current as a sum of the transmitted currents;

calculating an overall restraining current;

converting the overall differential current and the overall restraining current into a first equivalent current of an equivalent two-terminal power apparatus and a second equivalent current of the equivalent two-terminal power apparatus, wherein a sum of the first equivalent current and the second equivalent current substantially equals the overall differential current of the original power apparatus, and wherein the values of the first equivalent current and the second equivalent current substantially yield the overall restraining current of the power apparatus; and calculating a complex current ratio of the first equivalent current and the second equivalent current.

22. The method of claim 21, wherein applying the alpha plane analysis comprises:

calculating a magnitude value of the complex ratio of the first equivalent current and the second equivalent current;

calculating an angle difference value between the first equivalent current and the second equivalent current; and comparing the ratio magnitude value and the angle difference value against preselected values that establish a phase region in a current ratio plane, wherein when the ratio magnitude value and the angle difference value are outside the established region, the tripping is allowed, and wherein when the ratio magnitude value and the angle difference value are within the established region, the tripping is blocked.

23. The method of claim 17, wherein calculating a total charging current comprises calculating, at respective terminals, local contributions to a charging current compensation value, each local contribution based on a local voltage measurement, a line capacitance value, and a multiplier corresponding to a total number of terminals contributing to the charging current compensation value.

24. The method of claim 17, wherein calculating a compensated differential current comprises:

subtracting, at respective terminals, local contributions to a charging current from the measured local currents; and summing the differences.

25. A system for current differential protection using charging current compensation for a power apparatus, the system comprising:

means for measuring local currents at respective terminals of a power apparatus;

means for calculating a total charging current of the power apparatus using an average line voltage derived from the measurements at respective terminals;

means for calculating a compensated differential current for the power apparatus by subtracting the calculated total charging current from a sum of the measured local currents;

means for calculating a complex current ratio corresponding to the compensated differential current;

means for applying an alpha plane analysis to the complex current ratio; and means for selectively tripping, based on the alpha plane analysis, the power apparatus.

* * * * *